US009835083B2

United States Patent
Cunningham et al.

(10) Patent No.: US 9,835,083 B2
(45) Date of Patent: Dec. 5, 2017

(54) OSCILLATING PISTON ENGINE

(71) Applicants: Stephen L. Cunningham, Altadena, CA (US); Martin A. Stuart, Burbank, CA (US)

(72) Inventors: Stephen L. Cunningham, Altadena, CA (US); Martin A. Stuart, Burbank, CA (US)

(*) Notice: Subject to any disclaimer, the term of this patent is extended or adjusted under 35 U.S.C. 154(b) by 291 days.

(21) Appl. No.: 14/571,957

(22) Filed: Dec. 16, 2014

(65) Prior Publication Data

US 2015/0128896 A1    May 14, 2015

Related U.S. Application Data

(63) Continuation of application No. 13/074,510, filed on Mar. 29, 2011, now Pat. No. 8,919,322.

(Continued)

(51) Int. Cl.
*F02B 53/14* (2006.01)
*F01C 9/00* (2006.01)
(Continued)

(52) U.S. Cl.
CPC ............... *F02B 53/14* (2013.01); *F01C 9/002* (2013.01); *F02B 53/02* (2013.01); *F02B 55/16* (2013.01);
(Continued)

(58) Field of Classification Search
CPC .......... F02B 53/14; F02B 53/02; F02B 55/16; F02B 2730/01; F01C 9/002; F01C 21/08; Y02T 10/17
(Continued)

(56) References Cited

U.S. PATENT DOCUMENTS 556,032 A    3/1896  Standbridge
2,085,070 A  11/1933 Pavlecka
(Continued)

FOREIGN PATENT DOCUMENTS

FR        969830 A     12/1950
WO   WO 92/14036        8/1992

OTHER PUBLICATIONS

SINTEF Energy Research; TR No. TR A6570; Date: Oct. 8, 2007; Project No. 16X732; Technical Report entitled ,"Co2 as working fluid in a Rankine cycle for electricity production from waste heat sources on fishing boats".

(Continued)

*Primary Examiner* — Patrick Maines
(74) *Attorney, Agent, or Firm* — Bodi Law LLC

(57) ABSTRACT

An engine configuration that uses multiple opposing piston pairs to form respective expansion chambers for expanding a gas within to move the pistons to drive a main shaft. The engine can be configured to operate as an internal combustion engine that uses diesel fuel, gasoline, or natural gas, or it can be configured as an expander to convert high pressure high temperature gas to rotary power. The pistons may be mounted on the circumference of one or more disks. For any given set of choices of numbers of pistons and sizes of pistons, disks, and gears, there are disclosed dimensional constraints useful for more efficient functioning of the engine. This engine can be provided with a compact design which results in high power to weight ratios.

17 Claims, 29 Drawing Sheets

Related U.S. Application Data

(60) Provisional application No. 61/282,774, filed on Mar. 30, 2010.

(51) Int. Cl.
   *F02B 53/02* (2006.01)
   *F02B 55/16* (2006.01)
   *F01C 21/08* (2006.01)

(52) U.S. Cl.
   CPC .......... *F01C 21/08* (2013.01); *F02B 2730/01* (2013.01); *Y02T 10/17* (2013.01)

(58) Field of Classification Search
   USPC ........................................................ 123/245
   See application file for complete search history.

(56) References Cited

U.S. PATENT DOCUMENTS

| | | | |
|---|---|---|---|
| 1,950,228 A * | 3/1934 | Dedieu | F01C 1/067 418/151 |
| 2,157,764 A | 5/1939 | Langrognet | |
| 2,300,191 A | 10/1942 | Young | |
| 2,301,667 A | 11/1942 | Lutz | |
| 2,606,541 A | 8/1952 | Lutz | |
| 2,840,058 A * | 6/1958 | Stringer | F01C 1/063 418/185 |
| 3,237,403 A | 3/1966 | Feher | |
| 3,244,156 A * | 4/1966 | Curtiss | F01C 1/063 123/245 |
| 3,359,957 A | 12/1967 | Mantzel | |
| 3,516,392 A | 6/1970 | Morgan | |
| 3,580,228 A | 5/1971 | Rocha | |
| 3,909,162 A * | 9/1975 | Nutku | F01C 21/18 123/245 |
| 3,974,801 A | 8/1976 | Brown | |
| 3,990,405 A | 11/1976 | Kecik | |
| 4,058,088 A | 11/1977 | Brown | |
| 4,084,550 A * | 4/1978 | Gaspar | F01C 1/077 123/245 |
| 4,127,036 A | 11/1978 | Pinto | |
| 4,257,752 A | 3/1981 | Fogarty | |
| 4,663,939 A | 5/1987 | Cosby | |
| 4,664,078 A * | 5/1987 | Bender | F01C 1/063 123/245 |
| 4,970,995 A | 11/1990 | Parsons | |
| 5,188,083 A | 2/1993 | Reisser et al. | |
| 5,203,287 A | 4/1993 | Wiley | |
| 5,222,463 A | 6/1993 | Farrell | |
| 5,303,546 A | 4/1994 | Farrell | |
| 5,323,737 A | 6/1994 | Farrell | |
| 5,324,176 A | 6/1994 | Farrell | |
| 5,327,745 A | 7/1994 | Gilmour | |
| 5,467,744 A | 11/1995 | Farrell | |
| 5,527,165 A | 6/1996 | Schadeck | |
| 5,794,573 A | 8/1998 | Sunley | |
| 6,293,775 B1 | 9/2001 | Bakhtine | |
| 6,302,253 B1 | 10/2001 | Link et al. | |
| 6,739,307 B2 | 5/2004 | Morgado | |
| 6,814,205 B2 | 11/2004 | Feldhaus et al. | |
| 6,860,373 B2 | 3/2005 | Kundermann et al. | |
| 6,880,494 B2 | 4/2005 | Hoose | |
| 6,990,942 B2 | 1/2006 | Takeuchi | |
| 7,114,605 B2 | 10/2006 | Grosspietsch et al. | |
| 7,182,061 B2 | 2/2007 | Georgescu | |
| 7,237,542 B2 | 7/2007 | Reisser | |
| 7,240,645 B2 | 7/2007 | Reisser | |
| 7,373,915 B1 | 5/2008 | Joniec | |
| 7,380,527 B2 | 6/2008 | Reisser | |
| 7,415,962 B2 | 8/2008 | Reisser | |
| 7,600,490 B2 | 10/2009 | Reisser | |
| 7,721,701 B2 | 5/2010 | Dec | |
| 7,730,869 B2 | 6/2010 | Li | |
| 8,210,151 B2 | 7/2012 | Drachko | |
| 2003/0066506 A1 * | 4/2003 | Masters | F01C 9/002 123/245 |
| 2004/0184923 A1 | 9/2004 | Iwanami et al. | |
| 2005/0050892 A1 | 3/2005 | Gould | |
| 2006/0150949 A1 * | 7/2006 | Kovalenko | F01C 1/07 123/241 |
| 2007/0175212 A1 | 8/2007 | Uno et al. | |
| 2007/0199323 A1 | 8/2007 | Yamaguchi et al. | |
| 2007/0199537 A1 | 8/2007 | Morgado | |
| 2008/0245345 A1 | 10/2008 | Huettlin | |
| 2009/0165461 A1 | 7/2009 | Klassen et al. | |
| 2009/0266075 A1 | 10/2009 | Westmeier et al. | |
| 2010/0024421 A1 | 2/2010 | Litwin et al. | |
| 2010/0251986 A1 * | 10/2010 | Zaraphonitis | F01C 1/077 123/18 A |
| 2010/0287920 A1 | 11/2010 | Duparchy | |
| 2011/0239981 A1 | 10/2011 | Cunningham et al. | |
| 2012/0174585 A1 | 7/2012 | Rampen et al. | |
| 2013/0133613 A1 * | 5/2013 | Domit | F02B 53/04 123/210 |

OTHER PUBLICATIONS

The MIT Center for Advanced Nuclear Energy Systems; Advanced Nuclear Power Technology Program; "A Supercritical Carbon Dioxide Cycle for Next Generation Nuclear Reactors"; V. Dostal, M.J. Driscoll, P. Hejzlar: MIT-ANP-TR-100; Mar. 10, 2004.
Wikipedia, the free encyclopedia; Swing-Piston Engine; 3 pages; Otto Lutz; internal combustion swing-piston engine; publication date unknown.
PCT International Search Report; International Application No. PCT/US2011/030322; Application: Stephen Lee Cunningham et al; Date of Actual Completion of International Search: Nov. 10, 2011; Date of Mailing of International Search Report: Nov. 11, 2011.
Extended European Search Report; Application No. EP 11 76 6457; Place of Search: Munich; Date of Completion of Search: Nov. 19, 2014.
Chen et al.; A comparative study of the carbon dioxide transcritical power cycle compared with an organic rankine cycle with R123 as working fluid in waste heat recovery; Applied Thermal Engineering 26 (2006); pp. 2142-2147.
Yamaguchi et al.; Solar energy powered Rankine cycle using supercritical CO2; Applied Thermal Engineering 26 (2006); pp. 2345-2354.
Dostal; A Supercritical Carbon Dioxide Cycle for Next Generation Nuclear Reactors; Czech Technical University in Prague, Czech Republic (2006); From Massachusetts Institute of Technology Libraries, Jun. 16, 2004.

* cited by examiner

OSCILLATING PISTON ENGINE

CROSS-REFERENCES TO RELATED APPLICATIONS

This application is a continuation of U.S. Pat. No. 8,919,322, filed on Mar. 29, 2011, which claims the benefit of U.S. provisional application Ser. No. 61/282,774 that was filed on Mar. 30, 2010, both of which are incorporated herein by reference.

FIELD OF THE INVENTION

This invention relates generally to the field of internal combustion engines, and this invention also relates to high pressure gas expanders. More specifically, this invention relates to the conversion of energy from one form (either chemical energy from the combustion of a variety of petroleum products or energy in the form of a high pressure gas) into rotational mechanical energy using an oscillating disk methodology. The rotational mechanical energy can be used to drive a generator to create electricity or drive a transmission in a moving vehicle (car, truck, plane, or boat).

BACKGROUND OF THE INVENTION

The conventional internal combustion engines use pistons that move in a linear back and forth motion. This motion is transferred to a rotating crank shaft by a set of off-set bearings. Both the diesel and conventional gas engines are based on four cycles of intake, compression, ignition/expansion (or detonation), and exhaust. The two cycle engines most often have ports instead of valves, and combine the intake/compression cycles and the expansion/exhaust cycles. However, conventional engines tend to have relatively low efficiencies, large mass to energy ratios, and relatively large volume requirements, any of which where improvement is highly desirable. Furthermore, conventional engines tend to require relatively high RPMs to develop sufficiently high torque.

Some prior art engines that attempt to overcome some of these problems utilize a set of pistons that move around a toroidal chamber having a complex central shaft structure, using ports instead of valves and having a fixed main gear tied to the chassis and planetary drive gears that rotate around the main gear, while localizing the combustion in a part of the toroidal piston chamber. However, such a solution has the problem of localized high temperature spots and the strength of materials to transfer the high torque to the drive shaft.

Other engines are based on an earlier Morgan engine, using a rotating toroidal chamber (where the entire chamber spins) with pistons that oscillate. The torque is transferred to a crank shaft via a "Scotch yoke" tied to central co-linear cylinders that in turn are tied to the oscillating piston disks. Such engines have the problem of a large spinning toroidal chamber with electrical slip rings needed to carry the spark plug currents and a heavy Scotch yoke configuration to transfer the torque to the crank shaft.

The $CO_2$ refrigeration cycle has attained recent renewed interest because of there are few, if any, environmental issues with its use. In this cycle, high pressure $CO_2$ in its trans-critical phase is sent through an expansion valve to create a cold spot inside a refrigerator. The gas/liquid combination is warmed by taking heat from the inside of the refrigerator and becomes a vapor which is then pressurized by a compressor into its trans-critical phase. This compressed gas is cooled outside the refrigerator with ambient air, and then pumped into the refrigerator to the expansion valve to complete the cycle. By running the refrigeration cycle in reverse, it is possible to convert low quality heat (heat in the range of 300 degrees Celsius) into mechanical energy. In this reverse cycle, liquid $CO_2$ is pressurized into its trans-critical phase, and then heat is added to raise its temperature. Next the gas is put through an expander which cools the trans-critical $CO_2$ and converts the high pressure gas energy to mechanical energy. Finally the gas is condensed back into a liquid, and the cycle is repeated. The theory of the expander system based on the $CO_2$ cycle has been known for some time, but the missing element in this cycle is an expander which can be used with high pressure and low volume gas. Furthermore, improvements in efficiency, mass to energy ratios, and space volume considerations are also desirable.

SUMMARY OF THE INVENTION

The example devices disclosed herein incorporate features that provide novel and non-obvious improvements over conventional four-cycle internal combustion engines and two-cycle internal combustion engines. The examples provided herein are primarily based on a toroidal shaped combustion chamber having novel gearing and layout to make this invention different from any prior art currently known.

Some example embodiment of the engine described herein has pistons that are mounted rigidly on the perimeter of at least two circular disks. The two disks are placed next to each other with their respective pistons interleaved. The pistons disks oscillate back and forth as the pistons move in a fixed toroidal chamber that surrounds the circumference of the disks. The back and forth motion is transferred to rotating crank shafts by push arms that swivel on pins connected to the disks.

For example, some embodiments of the engine use multiple crank shafts that pass through holes in the disks. The holes in the disks allow each crank shaft to connect to both disks. The multiple crank shafts allow the high torque to be transferred to the main shaft by sharing the load without any one shaft needing to be unduly heavy, thus allowing substantial reductions in mass. The symmetric placement of the crank shafts leads to a balance of the forces and minimizes vibrations. The combustion chambers between the disks are distributed around the complete circumference of the toroidal chamber, which creates a uniform temperature distribution.

Another example engine uses a single crank shaft passing through a hole in a pair of disks, where one disk is fused to one side of a toroid combustion chamber and the other is free to oscillate, and, for each pair of pistons, the first piston is thus fixed in space to the fused disk, with the second piston disc free to oscillate with the second disk. One or more pairs of pistons can be utilized.

Provided are a plurality of embodiments of the invention, including, but not limited to, an engine comprising: a first disk having formed therethrough a first axial hole and a first offset hole offset from the axis of the first disk; a second disk having formed therethrough a second axial hole and a second offset hole offset from the axis of the second disk; a first piston attached to a circumference of the first disk; a second piston attached to a circumference of the second disk; a main shaft passing through the first axial hole and the second axial hole, wherein the main shaft can rotate within the first axial hole and the second axial hole; a crank shaft passing through the first offset hole and the second offset hole, wherein the crank shaft can rotate within the first offset hole and the second offset hole; a rotation transmission mechanism for connecting the crank shaft to the main shaft, the rotation transmission mechanism being structured such that a rotation of the crank shaft imposes a rotation on the main shaft; an oscillation transmission mechanism for connecting one of the first disk or the second disk to the crank shaft, the oscillation transmission mechanism being structured for transmitting an oscillation of the one of the first disk or the second disk into a rotation of the crank shaft; and a housing The housing of the above engine forms a chamber for at least partially containing the first piston and the second piston such that the first piston on the first disk and the second piston on the second disk are arranged with the chamber for forming an expansion volume between the first piston and the second piston. The expansion volume of the engine alternatively compresses and expands a volume within the expansion volume as the engine is operating by the oscillation of at least the one of the first disk or the second disk about the main shaft, thereby converting the oscillation to a rotation of the crank shaft which thereby rotates the main shaft.

Further provided is an option for the above engine, where one of the disks can be fixed to the housing so that it does not oscillate, and thus need not be connected to the crankshaft.

Also provided is an engine comprising: a first disk having formed therethrough a first axial hole and a plurality of first offset holes, each of the first offset holes being offset from the axis of the first disk; a second disk having formed therethrough a second axial hole and a plurality of second offset holes equal to the number of first offset holes, each of the second offset holes being offset from the axis of the first disk; a plurality of piston pairs, each of the piston pairs including a first piston attached to a circumference of the first disk and a second piston attached to a circumference of the second disk; a main shaft passing through the first axial hole and the second axial hole, the main shaft having at least one main gear; a plurality of crank shafts, each one of the crank shafts corresponding to one of the first offset holes, wherein each one of the crank shafts passes through the corresponding one of the first offset holes and also passes through a corresponding one of the second offset holes; a plurality of crank shaft gears, each one of the crank shaft gears being attached to a corresponding one of the crank shafts for connecting the corresponding one of the crank shafts to the at least one main gear of the main shaft for transmitting a rotation of the corresponding one of the crank shafts to the main shaft; a plurality of push rods, each one of the push rods connected to one of the first disk or the second disk, and also connected to a crank on a corresponding one of the crank shafts, each one of the push rods for transmitting an oscillation of the one of the first disk or the second disk into a rotation of the corresponding crank shaft; and a housing.

The housing of the engine forms at least one chamber for at least partially containing the plurality of piston pairs, such that the first piston and the second piston of each one of the piston pairs are arranged with the at least one chamber for forming a corresponding expansion volume between the first piston and the second piston. For each expansion volume, the corresponding piston pair alternatively compresses and expands the volume within the expansion volume as the engine is operating by the oscillation of the first disk about the main shaft, thereby converting the oscillation to a rotation of each one of the crank shafts which thereby rotate the main shaft.

Further provided is an engine comprising: a piston pair including a first piston arranged opposing a second piston; a housing for forming a chamber corresponding to the piston pair, such that the first piston and the second piston are arranged within the chamber for forming an expansion volume between the first piston and the second piston; a main shaft; a plurality of crank shafts; a mechanism for converting a motion of one or both of the first piston and the second piston, caused by an expansion of the expansion volume, into a rotation of each one of the plurality of crank shafts; and one or more rotation transmission mechanisms for connecting each one of the crank shafts to the main shaft for rotating the main shaft when one or more of the crank shafts rotate.

Also provided is an engine comprising: a plurality of piston pairs, each one of the piston pairs including a first piston arranged opposing a second piston; a main shaft; a plurality of crank shafts; a mechanism for generating a rotation in each one of the crank shafts from the relative motion between the first piston and the second piston of each one of the piston pairs; and a mechanism for transferring the rotation of the crank shafts into a rotation of the main shaft.

Further provided is an engine comprising: at least one piston; a main shaft having at least one main gear; a plurality of crank shafts distributed around the main shaft, each one of the crankshafts having a crank shaft gear connecting to the at least one main gear; and a mechanism for generating a rotation into each one of the crank shafts from a motion of the at least one piston, such that the rotation of the crank shafts is converted into a rotation of the main shaft.

Also provided is an engine comprising: a plurality of pistons arranged around a circumference having a center axis; a housing for housing the pistons; a main shaft positioned through the axis and passing within the housing; and a mechanism for converting a motion of the pistons into a rotation of the main shaft. The motion of the pistons is a partial rotational oscillation of the pistons about the axis traversing an arc substantially less than 90 degrees, and the engine transmits torque to a load via the main shaft.

Further provided is an engine comprising: a plurality of opposing piston pairs arranged around a circumference having a center axis; a housing for housing the pistons; a main shaft positioned through the axis and passing within the housing; and a mechanism for converting a relative motion of the pistons in each of the piston pairs into a rotation of the main shaft. For the pistons of each piston pair, the relative motion of the pistons includes each piston alternatively oscillating toward and away from a fixed point between the pistons of the piston pair. Also, the engine transmits torque to a load via the main shaft.

Also provided are additional embodiments of the invention, some, but not all of which, are described hereinbelow in more detail.

BRIEF DESCRIPTION OF THE DRAWINGS

For a fuller understanding of the nature of the present invention, reference should be made to the following detailed description taken in conjunction with the accompanying drawings.

DETAILED DESCRIPTION OF THE EXAMPLE EMBODIMENTS

Figure 1:
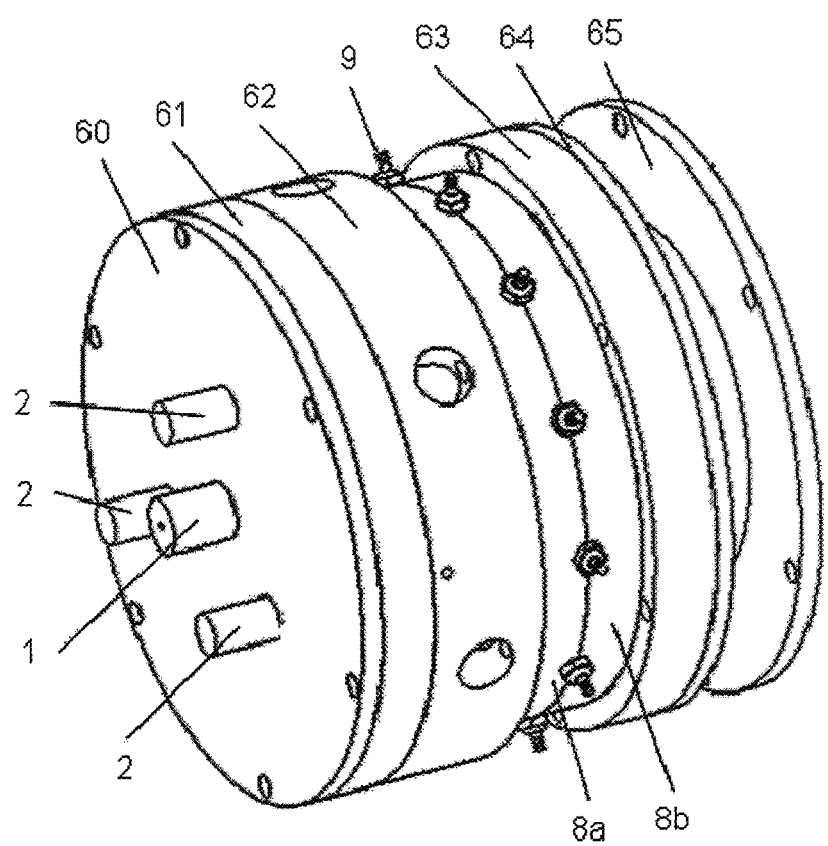
FIG. 1 shows the external view of one embodiment of the engine.

In setting the particular example engine configurations described in this disclosure, a number of arbitrary choices are made. But once such choices are made, some other parts of the engine would likely be constrained to have certain specific values or ranges of values. In this detailed description, only some of the many possible configuration options for the engine in this invention are described. Also described are a number of the constraints that can be placed on certain of the dimensions of the parts within the engine that are desired to function in a more beneficial and optimal way. Of course, other example embodiments are possible that fall within the scope of this application, but only exemplary embodiments are described to communicate the basic principles involved.

There are a number of different embodiments of this invention which result from a number of arbitrary choices that can be made, many of which are described hereinbelow. Even with these various choices, the underlying principles in the invention are maintained. These choices are delineated below in the detailed description section, and include type of engine (either two-stroke, four-stroke, or expander), compression ratio, number of pistons, number of crank shafts, gear ratio, size of pistons, thickness of pistons, and radius of the disks. These choices lead to different embodiments that vary in power, weight, and engine speed. To illustrate the specifics of these choices, some example embodiments are chosen to be described more completely in this disclosure.

The example devices disclosed herein incorporate features that provide novel and non-obvious improvements over conventional four-cycle internal combustion engines, two-cycle internal combustion engines, and conventional expander engines. The disclosed embodiments are primarily based on the use of a toroidal shaped combustion chamber including components with novel gearing and layout to make these example engines different from any currently known solutions. In addition, some of the examples utilize the $CO_2$ refrigeration cycle, wherein high pressure $CO_2$ in its trans-critical phase is used as an environmentally friendly refrigerant. However, the expander embodiment of this invention uses the refrigeration cycle in reverse to conventional engines thereby extracting energy from the high pressure gas.

As described in more detail below with respect to the figures, some example embodiment of the engine described herein utilize pistons that are mounted rigidly on the perimeter of at least two circular disks. The two disks are placed next to each other with their respective pistons interleaved. The pistons disks oscillate back and forth as the pistons move in a fixed toroidal chamber that acts as a housing surrounding the circumference of the disks and encasing the pistons. The back and forth motion is transferred to rotating crank shafts by push arms that swivel on pins connected to the disks, and the crank shafts impose a rotation on a central main shaft. Thus, the pistons oscillate about a central axis in an arc of some number of degrees that are substantially less than 90° (i.e., the pistons do not rotate around the main shaft, but oscillate about it in an arc). In most applications, this arc will be about 45°.

However, a simplified example engine is provided, also described in more detail below, that utilizes a single crank shaft passing through a hole offset from the center in a pair of disks, where one disk is fused to one side of a toroid combustion chamber and the other is free to oscillate, and, for each pair of pistons, the first piston is thus fixed in space to the fused disk, with the second piston disc free to oscillate with the second disk. One or more pairs of pistons can be utilized.

Another example engine also described below uses multiple crank shafts that pass through holes in the disks. The holes in the disks are offset from the centers of the disks and allow each crank shaft to connect to both disks, and are designed to allow the disks the freedom to oscillate. The multiple crank shafts allow the high torque to be transferred to the main shaft, using gears (or using an alternative means of transferring rotation, such as by using belts/pulleys, chains, etc.), by sharing the load without any one shaft needing to be unduly heavy, thus allowing substantial reductions in mass over conventional designs. The symmetric placement of the crank shafts leads to a balance of the forces and minimizes vibrations. The combustion chambers between the disks are distributed around the complete circumference of the toroidal chamber housing, which creates a uniform temperature distribution. These fundamental designs allow these example engines to overcome one or more deficiencies in conventional designs. In addition, unlike conventional engines, the high torque that is possible with the multiple pistons allows the engine to develop high horse power output at relatively low rpm.

The size of the engines that can be provided using the features disclosed herein can vary from the very small (e.g., size of a D-cell battery or smaller) to very large (e.g., size sufficient to propel large ships). The small engine has the ability to be used as an expander for the trans-critical $CO_2$ application. For systems that generate a few kilowatts of energy, the gas flow rate is low, and there is no existing expander which operates efficiently for low gas flow rates. Some embodiments of this engine can be provided to fill that need. High pressure $CO_2$ on the order of 120 to 200 atmospheres and between 150 to 400 degrees Celsius is fed into the piston chambers. The pistons move to expand the gas and reduce the pressure to between 60 and 120 atmospheres and lower the temperature by between 50 and 150 degrees Celsius. The gas is then cooled to ambient temperatures, the condensed liquid is pressurized to the trans-critical state, heat is added to increase the temperature and the cycle is repeated. This cycle takes the low grade heat which can come from, for example, a roof mounted solar heater or waste heat from a power plant or other internal combustion engine and converts it to rotational mechanical energy which can drive a load, such as an electricity generating system, for example. The volume of gas needed for this cycle for home power applications is low.

Configuration Options:

There are at least nine fundamental options that define the different examples of the engine in this invention, leading to a number of different potential embodiments. All such example embodiments, among others, are intended to be covered by this disclosure. Nine of these options are summarized below:

Option 1: The engine can be configured in a two cycle, four cycle or expander version. This option determines the nature of the valves or ports that control the intake and exhaust in each piston chamber. The detailed example shown in FIGS. 1-25 is for a two cycle engine, with the other options requiring some modifications of this example that are within the skill of the art, based on the disclosures provide herein.

Option 2: The desired compression ratio (the ratio of the largest chamber size to the smallest chamber size) should be chosen. This ratio can be about 8:1 for a 4-cycle gas engine, about 14:1 for a ported 2 cycle gas engine, about 18:1 for a diesel version, and about 2:1 for the expander version. This choice is useful for determining the push rod axis off-set distance on the crank shaft and the valve timing (or port sizing). The example shown in FIGS. 1-25 is for a compression ratio of about 14:1 (this value is the geometric ratio; the actual pressure compression is effectively changed by the size of the exhaust port and is closer to 8:1).

Option 3: The number of cylinders in a single toroid can be any even number with the limit usually between 6 and 16 (or even more) depending on piston size and toroid radius. The example shown in FIGS. 1-25 is for a 12 cylinder version, but as discussed, any even number of 2 or more could be accommodated based on the purpose of the engine.

Option 4: The number of crank shafts can vary between one and four (or more). This choice affects the number of through holes in each of the piston disks. The reason for choosing to have more than one crank shaft is due to the very high torque that is generated by the multiple pistons that must be transferred to the crank shaft(s). For example, one might want to have a crankshaft for each piston on a disk. Multiple crank shafts allow for sharing of the torque along multiple load paths. For the example shown in FIGS. 1-25, there are three crank shafts, but any number of 1 or more could be utilized as desired for the engine's intended purpose, with more crank shafts being utilized where higher torques at lower RPMs is desirable.

Option 5: The gear ratio between the main gear and the secondary gears on the crank shafts should also be chosen. This ratio can be any value, but for practical purposes it will fall between 1:1 and 2:1 so that the separate gears don't carry a disproportionate amount of torque. The example shown in FIGS. 1-25 uses a gear ratio of 49:33 (tooth count) or 1.485.

Option 6: Piston face diameter can be any value depending upon the ultimate desired power of the engine, with larger diameters providing more power. For the example shown in FIGS. 1-25, the piston diameter is 1.8 cm, but the value could be reduced by ⅓ or more, or increased by a factor of 10 or more, if desired.

Option 7: The piston thickness is important for determining horsepower and the volume of air that passes through the engine. Thinner pistons result in higher horsepower, but the practical limit is set by the desired strength of the attach point between the piston and the support disk, and the materials that are used. Piston thicknesses are measured in degrees of toroid arc. The example shown in FIGS. 1-25 uses a piston thickness of about 18 degrees, but other thicknesses could be utilized, as desired, depending on the needs of the user.

Option 8: The disk radius (distance to the base of the pistons) should be chosen. This value is limited on the small side by the dimensions of the transmission gears, since the gears set the distance between the main shaft center line and the crank shaft center line, and the crank shaft passes through a hole in the disks. For practical purposes in most circumstances, the radius of the disk should be greater than 2× times the radius of the main gear. The example shown in FIGS. 1-25 uses a main gear radius of about 2 cm. and a disk radius of about 5 cm, although this could be modified, as desired for particular situations.

Option 9: The last option is to choose whether to lock one of the piston disks to the toroid, and thereby have only one movable disk with pistons. For this option, the pistons on the separate disks do not need to be the same size. In this approach, the disk that is locked to the toroid is not connected to the crank shaft. With only one movable disk, the piston stroke is longer than the case where both are moving and this makes the crank shaft offset larger. This option will have a second toroidal chamber to mirror the first, and the movable disk in the second toroid chamber will be moving out of phase with the movable disk on the first toroid chamber so that the crank shaft that is common to both movable disks has offset cams that are not aligned with each other.

These nine options define the primary different engine configurations that are possible and that are covered by this disclosure. Other parameters needed for the definition of the engine are derived based on these above choices.

Example Configurations

With the above set of choices for the nine options, the embodiment of the engine used as the specific example shown in FIGS. 1-31 can be summarized as follows: It is a two cycle engine with 12 pistons, each piston is about 1.8 cm in diameter, they are mounted on the perimeter of a disk of about 5 cm radius, each piston has a thickness of about 18 degrees of arc. The transmission is comprised of 3 crank shafts connected to a center main shaft through gears with a ratio of about 1.485. The outer dimension of the engine is a little over 6 inches (about the size of a 2 pound coffee can), and the engine generates more than 10 horsepower at 5000 rpm (which is a relatively slow rotational speed for an engine of this size).

FIG. 1 shows an external view of the main part of the engine. Protruding from one end are the main shaft 1 and three crank shafts 2. Central to the motor are two halves of the toroidal combustion chamber, 8a and 8b, which contain twelve glow plugs 9 (or spark plugs). On one side of the toroidal chamber 8a is the intake manifold 62, and on the other side 8b is the exhaust manifold 63. The bearings on the main shaft and the crank shafts are supported by the bearing plate 61, the intake manifold 62, and the exhaust manifold 63. The end plate 60 contains the seals for the shafts, and plates 64 and 65 are used to channel the exhaust away from the engine. Not shown are the structure that covers the intake manifold ports and the structure that carries the exhaust to the muffler.

Figure 2:
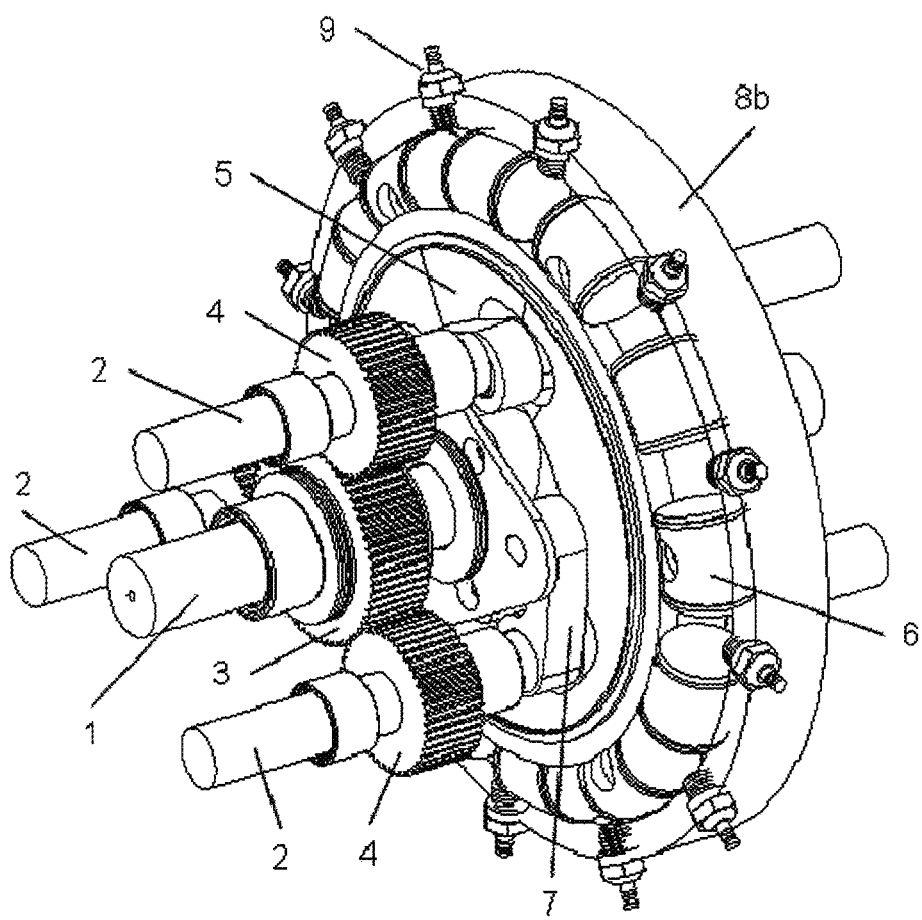
FIG. 2 is a composite of one embodiment of the internal parts of the engine showing the main shaft, crank shafts, piston disk, push rods, and opened toroid chamber with pistons and glow plugs.

FIG. 2 shows a cut-away view of the core of the engine for the particular chosen example configuration. (The cut-away version does not show one half of the toroidal chamber in which the pistons move, nor does it show the external casing that holds the bearings for each of the moving parts.) External to the core of the engine are the valves and manifolds whose designs vary depending upon the particular engine configuration desired (diesel, gas, or expander). In FIG. 2, the left piston disk 5 is shown (the right piston disk is behind it and cannot be seen in this figure) inside the right half of the toroid combustion chamber 8b. There are six pistons 6 on the left piston disk 5 and an equal number on the right piston disk, giving a total of twelve pistons in the toroidal chamber and thus twelve separate combustion chambers are formed.

The combustion chambers are under each of the twelve spark plug/glow plugs 9. Each disk has three push rods 7 attached to the off-set bearing that lies within each of the three crank shafts 2. Each crank shaft has a secondary gear 4 which drives a main gear 3 mounted on the main shaft 1. The resulting oscillating motion of the piston disks during operation is transferred to rotary motion of the main shaft through the crank shafts 2. Each crank shaft 2 passes through a corresponding hole in the disk so that each of the two disks is connected via a push rod to each of the crank shafts.

Figure 3:
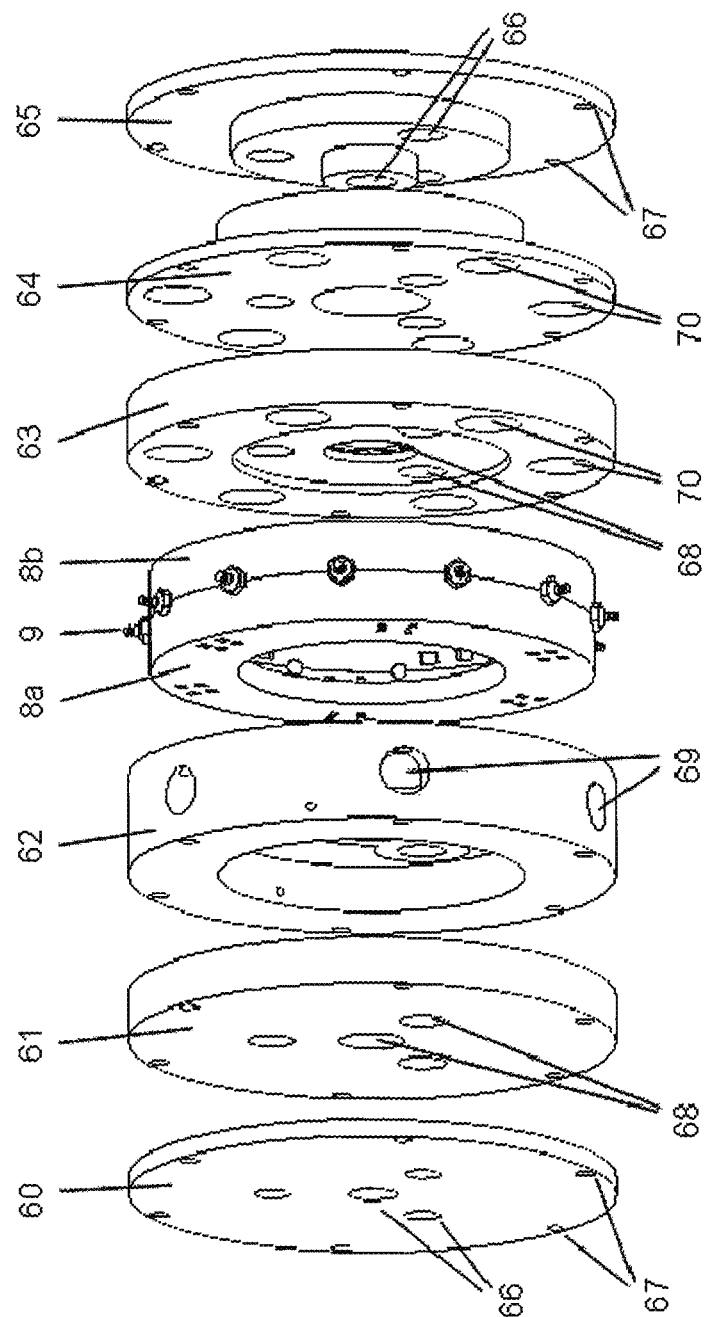
FIG. 3 shows an exploded view of the external case of one embodiment of the engine showing the relationship between the central toroid chamber, the intake and exhaust manifolds, and the casings that support the main shaft and crank shaft bearings.

FIG. 3 shows the exploded view of the external case of this embodiment of the engine. The end plate 60 holds the seals for the pass-through holes 66 for the main shaft and the three crank shafts. The bearing plate 61 has holes 68 that are sized to fit the bearings that are on the main shaft and the crank shafts. The intake manifold 62 has six ports 69 which channel the fuel air mixture to the ports in the toroidal chamber 8a. The intake manifold also gives support to the bearings on the three crank shafts (not shown in this figure). Similar to the bearing plate 61, the exhaust manifold 63 has holes 68 that support the bearings on the main shaft and the three crank shafts. In addition, the exhaust manifold 63 has six exhaust ports 70 that are aligned with the exhaust ports in the toroid 8b. The exhaust ports 70 extend through plate 64 and are redirected by the exhaust deflection plate/end plate 65. End plate 65 also has openings 66 that contain seals for the main shaft and the crank shafts. Also shown are six bolt holes 67 around the circumference of each plate which are used to bolt the structure together.

Figure 4:
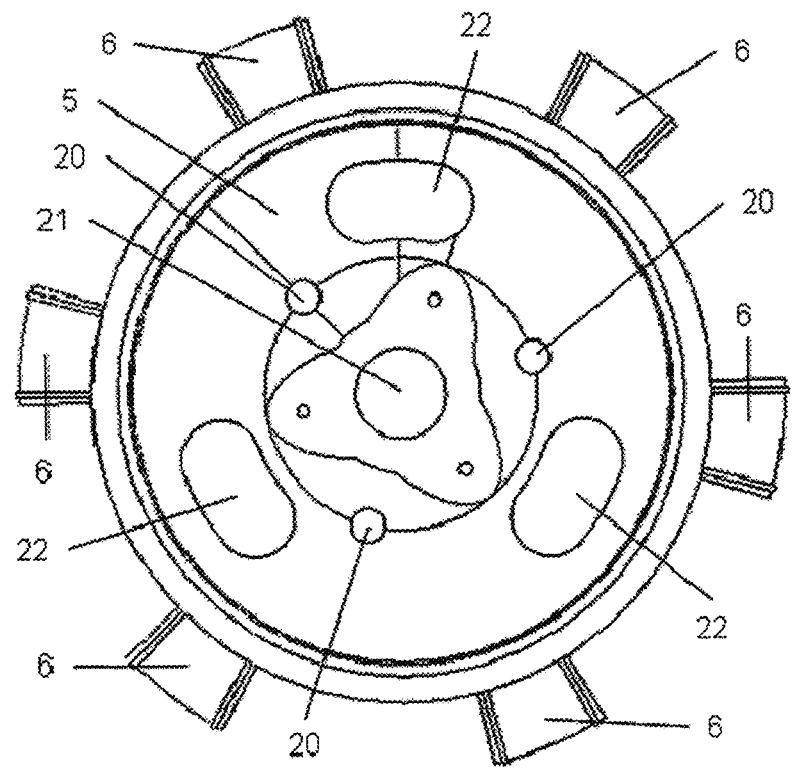
FIG. 4 shows an example of one of the piston disk assemblies of an example embodiment of the engine.

FIG. 4 shows one of the disks 5 with six rigidly mounted pistons 6. Push pins 20 connect, via a push rod (not shown in the figure), to the crank shafts (also not shown in the figure). The crank shafts extend through the crank shaft holes 22 in the disk to be able to connect to the push rods on the adjacent piston disk. The center hole 21 holds bearings allowing the disk to oscillate freely on the main rotating shaft (see FIG. 5). The disks do not rotate about the engine, but oscillate back-and-forth (partial rotation through an arc) about fixed centers. The crank shaft holes 22 are elongated (somewhat oval or "bean" shaped) to give clearance between the oscillating disks and the pass-through crank shaft.

Figure 5:
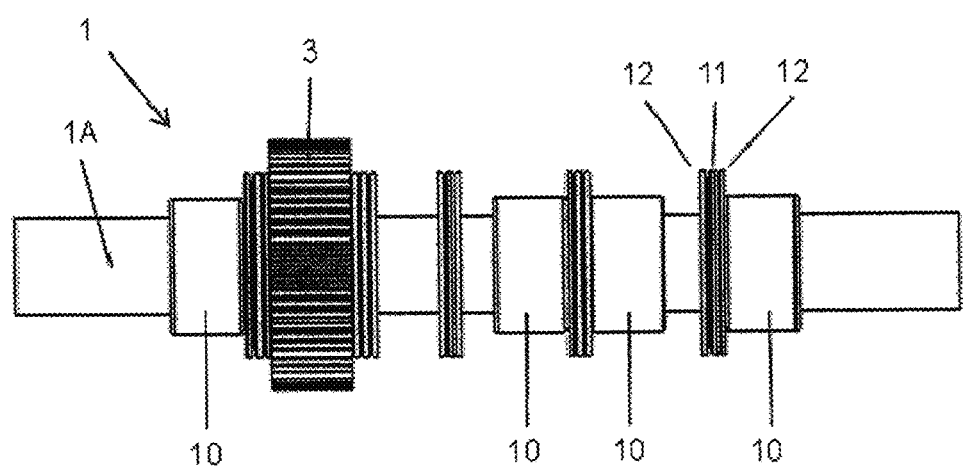
FIG. 5 shows an example of main drive shaft for the example embodiment of the invention showing the main gear and an assembly of bearings.

FIG. 5 shows the main shaft structure 1 which holds the main gear 3. The main shaft 1 runs through the entire engine. In the example embodiment, the main shaft 1 has a rod 1A upon which is mounted four main bearings 10, two of which are supported by the external case of the engine (bearing plate 61 and exhaust manifold 63) and two of which support the two oscillating disks. In addition, there are five thrust bearings 11 sandwiched between ten bearing races 12. These thrust bearings allow for the separate motion of the disks and gears relative to the fixed case.

Figure 6:
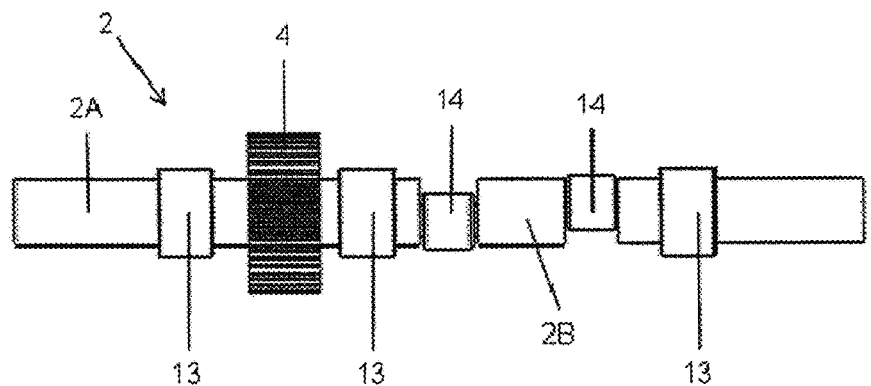
FIG. 6 shows an example of a crank shaft showing the secondary gear, shaft bearings, and wrist pin bearings for offset shafts for the example embodiment.

FIG. 6 shows one of the three crank shafts 2. Each crank shaft has a rod 2A upon which is mounted one secondary gear 4 and two off-set cranks formed in the rod 2A covered by wrist pin bearings 14. The portion of the crank shaft rod at 2B between the two wrist pin bearings 14 is the part that passes through the holes 22 in the piston disks 5 shown in FIG. 4. In this chosen example, each crank shaft 2 contains three crank shaft bearings 13 which are supported by the external case (bearing plate 61, intake manifold 62, and exhaust manifold 63).

Figure 7:
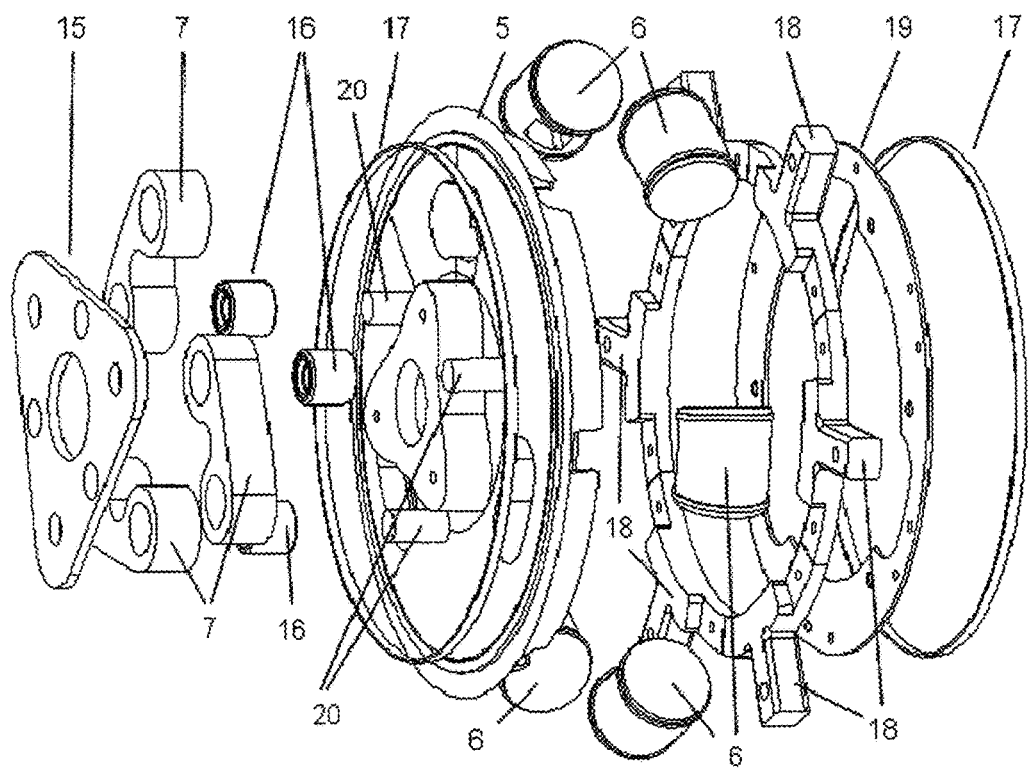
FIG. 7 shows an exploded view of one example embodiment of the left piston disk which includes six pistons and three push pins and rods.
Figure 8:
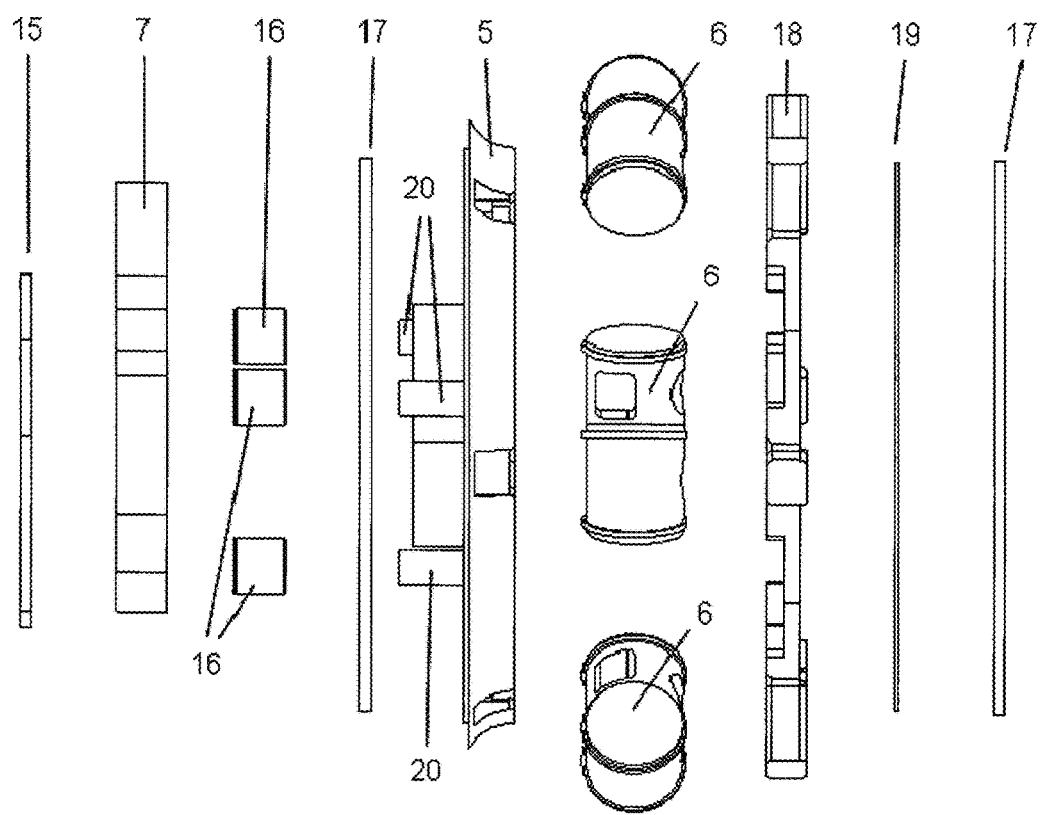
FIG. 8 shows a planar view of the example left piston disk embodied in FIG. 7.

FIG. 7 shows the exploded view, and FIG. 8 shows the planar view of the exploded view, of one of the piston disks. In the embodiment shown as an example of this invention, the primary disk structure 5 for the left hand disk supports six pistons 6. There are a variety of ways to connect the pistons 6 to the disk 5, and the one shown in FIG. 7 uses a piston peg 18 for each piston 6. The peg 18 is mounted on the disk 5 and held in place with a piston peg cover plate 19. Other methods of mounting the pistons 6 are acceptable, including casting the piston disk 5 and pistons 6 as a single piece, for example.

On the left face of the piston disk 5 are three push pins 20 which are covered by the push rod bearings 16 and which support the push rods 7. The bearings 16 and push rods 7 are held in place with a push pin cover plate 15 which has the added function of giving strength to the pins 20 which should be strong enough to carry the high torque from the piston disk to the crank shaft wrist pin bearings 14 in FIG. 6. Also shown in FIG. 7 and FIG. 8 are disk sealing rings 17 on each side of the disk. These sealing rings 17 reduce the leakage of high pressure gasses away from the combustion or expansion chambers.

Figure 9:
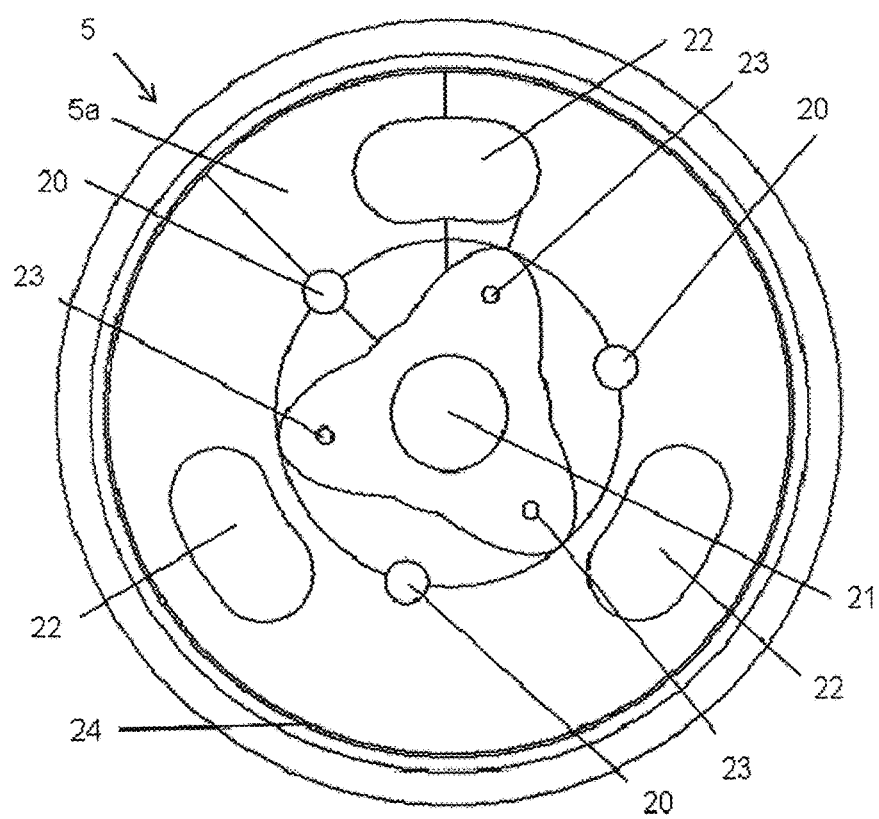
FIG. 9 shows the left face of the example left disk embodied in FIG. 7 showing the location of the push rod pins and the pass through holes for the crank shafts.

FIG. 9 shows the detail of the left face 5a of the left piston disk 5. The pass-through holes 22 allow passage of the crank shafts 2 and each is elongated to give clearance as the piston disk 5 oscillates back and forth. The center hole 21 in the disk allows for the passage of the main shaft 1 through the disk, and fits on one of the main bearings 10. The location of the three pins 20 which hold the push rod bearings 16 are at a very specific distance from the center line and at a specific angle with respect to the center of the crank shaft pass through holes 22. These specific dimensions and angles are explained in more detail using FIGS. 19, 20, and 21 and the accompanying description. The push pin cover plate 15 is held in place by the screw holes 23. The right piston disk, not shown, is paired up with the left piston disk 5, and its right face is the mirror image of the left face 5a shown in FIG. 9. In this way, the push rods 7 from the two disks are correctly arrayed with the opposing crank axis positions 14 on each of the crank shafts 2 such that the rotating motion of the crank shafts 2 give the proper oscillation motion of the pistons 6.

Figure 10:
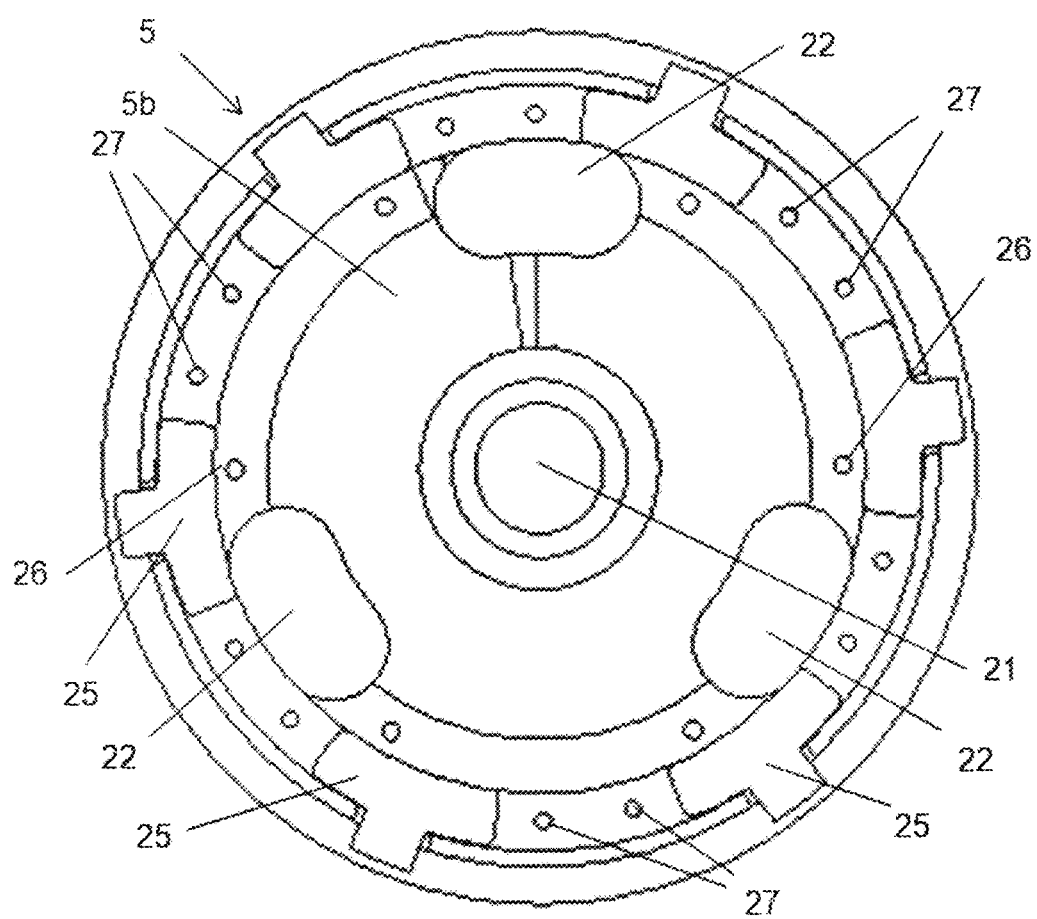
FIG. 10 shows the right face of the example left disk embodied in FIG. 7 showing the location of the piston pegs holding the pistons.

FIG. 10 shows the detail of the right face 5b of the left piston disk 5. This is the opposite side of the disk shown in FIG. 9. The pass-through holes 22 for the crank shafts 2 and the central hole 21 for the main shaft 1 are shown. The six piston pegs 18 (see FIGS. 7-8 and 12-15) fit within the piston peg slots 25. The piston pegs 18 are stabilized with holding pins that fit in the holes 27. The piston peg cover plate 19 is secured to the disk by the screw holes 26. The left face of the right piston disk (the other disk), not shown, is not the mirror image of FIG. 10. The crank shaft pass-through holes 22 and the central hole 21 for the main shaft are the same, but the piston peg slots 25 are rotated counter-clockwise by 15 degrees. This has the effect when the two piston disks are positioned face to face for the pistons to be properly aligned between each other as shown in FIG. 2.

Figure 11:
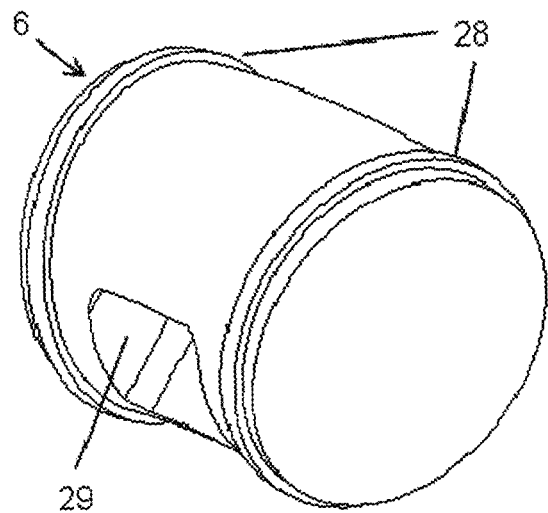
FIG. 11 shows one embodiment of the example piston structure embodied in FIG. 7 showing piston rings and the slot for the piston peg.

FIG. 11 shows the detail of one embodiment of a single piston 6 with curvature to match the toroidal chamber 8a, 8b (see FIG. 2). The piston 6 has a number of piston rings 28, two of which are shown, to seal the pistons 6 inside the toroid chamber 8. The slot for the piston peg 29 is shown for the case that pegs are used to secure the pistons.

Figure 12:
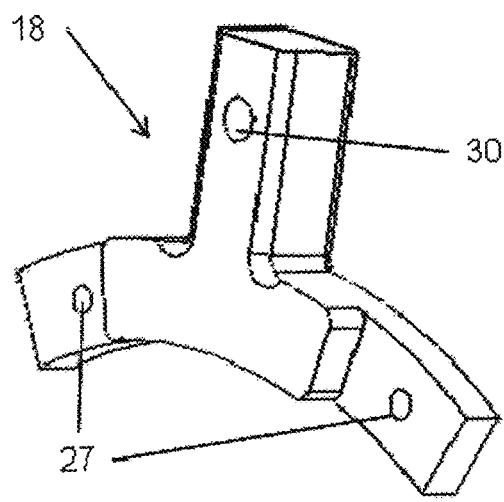
FIG. 12 shows one embodiment of the example piston peg embodied in FIG. 7 for attaching piston to piston disk.

FIG. 12 shows the detail of the piston peg 18 for this example embodiment. The peg 18 fits in the piston slot 29 (and fastens to the piston disk 5 in one of the slots 25. Pin holes 27 for the stabilization pins are shown along with a hole 30 for a pin that fastens the piston peg 18 to the piston 6.

Figure 13:
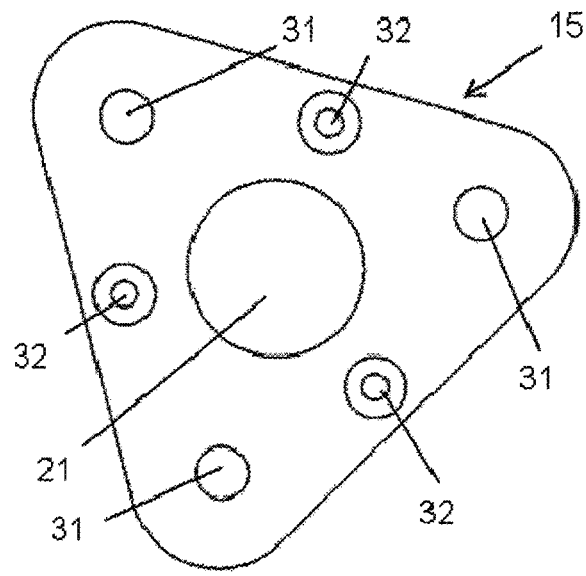
FIG. 13 shows a push rod cover plate embodied in FIG. 7.

FIG. 13 shows the detail of the push rod cover plate 15 that mounts on the left face 5a of the left piston disk 5. The main shaft 1 passes through the center hole 21. The push pins 20 fit snuggly in the pin holes 31 to give added strength. The distance of the pin holes 31 from the center is an important measurement as explained below regarding FIG. 19. The cover plate 15 attaches to the disk face 5a via screws that fit in holes 32.

Figure 14:
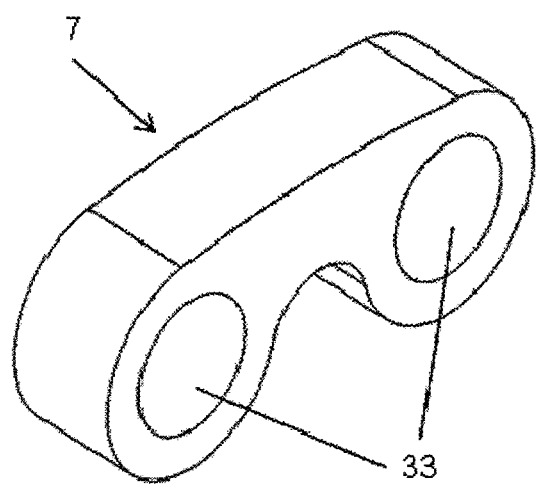
FIG. 14 shows one embodiment of the push rod embodied in FIG. 7 with one hole for the bearing on the crank shaft and the other hole for the bearing on the disk mounted push pin.

FIG. 14 shows one of the push rods 7 that connects the push pin 20 to the wrist pin bearing 14 on the crank shaft 2 (see FIG. 6). Between the push pin 20 and the bearing hole 33 in the push rod 7 is a bearing equivalent to the wrist pin bearing 14. The distance between the centers of the two bearing holes 33 on the push rod 7 can be an important measurement for design considerations.

Figure 15:
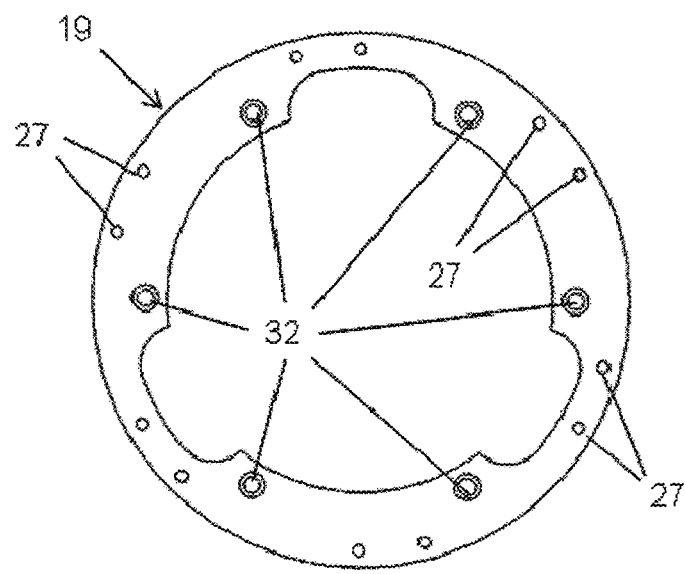
FIG. 15 shows one embodiment of the piston peg cover plate embodied in FIG. 7.

FIG. 15 shows the piston peg cover plate 19 for covering the piston pegs 18 on the right face 5b of the left piston disk 5. Pin holes 27 are shown for the stabilization pins and screw holes 32 are shown for the screws that fasten the plate 19 to the piston disk 5. The piston peg cover plate for the left face of the right piston disk (the other piston disk) is not the mirror image of the plate shown in FIG. 15. Rather, the pin holes for the stabilization pins are rotated counter-clockwise by 15 degrees to match the position of the piston pegs.

Figure 16:
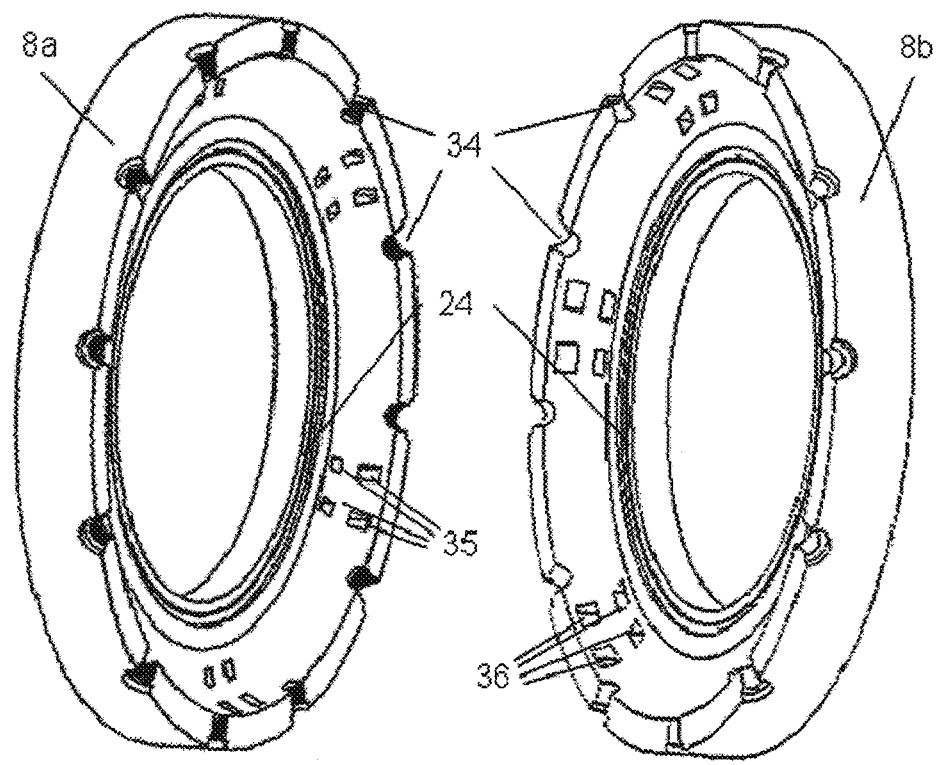
FIG. 16 shows one example embodiment of the two halves of an example toroid combustion chamber showing the location of glow plugs and intake and exhaust ports.
Figure 17:
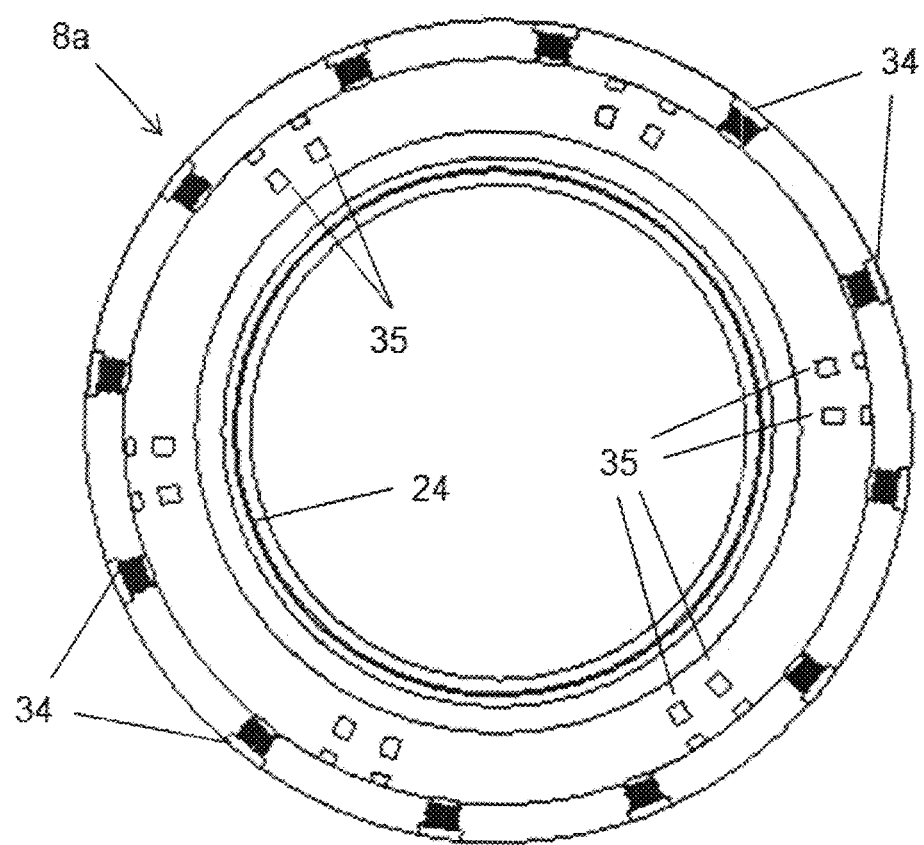
FIG. 17 shows the left half of the example toroid chamber showing the location of the intake ports relative to the position of the glow plugs.
Figure 18:
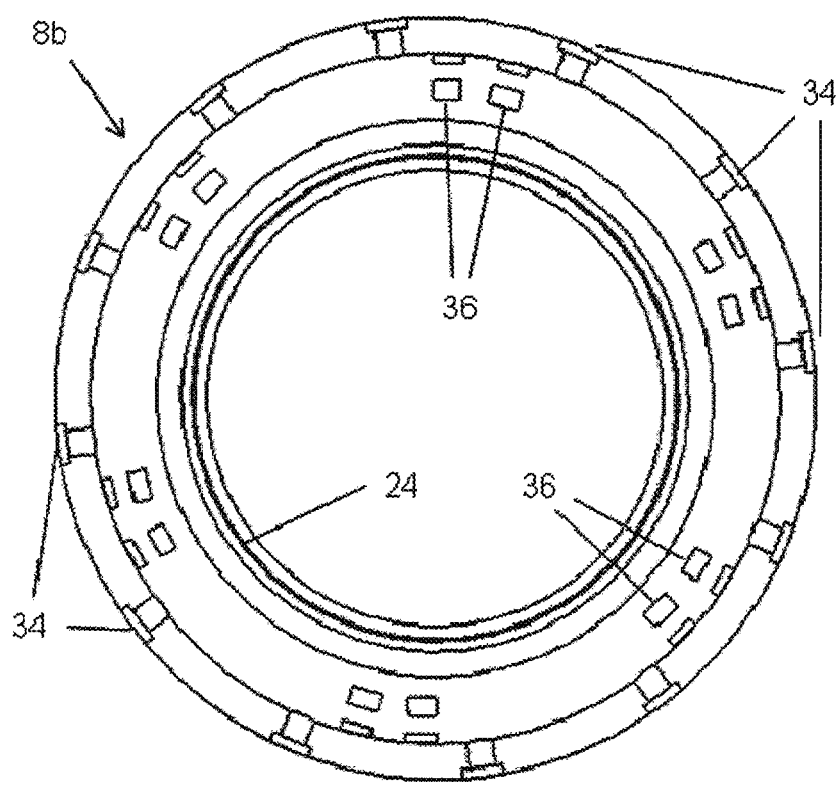
FIG. 18 shows the right half of the example toroid chamber showing the location of the exhaust ports relative to the position of the glow plugs.

FIG. 16, FIG. 17, and FIG. 18 show the left half 8a and the right half 8b of the toroidal combustion chamber 8. The pistons 6 make a tight fit with the halves of the toroid, and the inner portion of the toroid is made complete by the outer portion of the two piston disks 5. Each half of the toroidal combustion chamber has slots for the disk sealing rings 24. In the example two cycle engine embodiment being shown, the twelve glow plug inserts are located at positions 34. In the four cycle engine embodiment, these slots would be the location of the spark plug inserts. For the two cycle engine embodiment, the left half toroid 8a contains the intake ports 35, and the right half toroid 8b contains the exhaust ports 36. The angular position of these ports can be an important dimension for design considerations. What makes these dimensions unique is the fact that there is a "fast" side and a "slow" side of piston motion, so the location of the ports is not symmetrical with respect to the Bottom Dead Center position of the piston. For the expander embodiment of this invention, the timing of the opening of the intake valves for the two types of chambers is not identical. Both of these items are discussed more below. Also, when the right half and the left half of the toroid are combined, the intake ports are between alternating pairs of glow plugs, and the exhaust ports are between the other alternating pairs of glow plugs. The ports are not opposite each other, but displaced relative to each other by one glow plug position.

Figure 19:
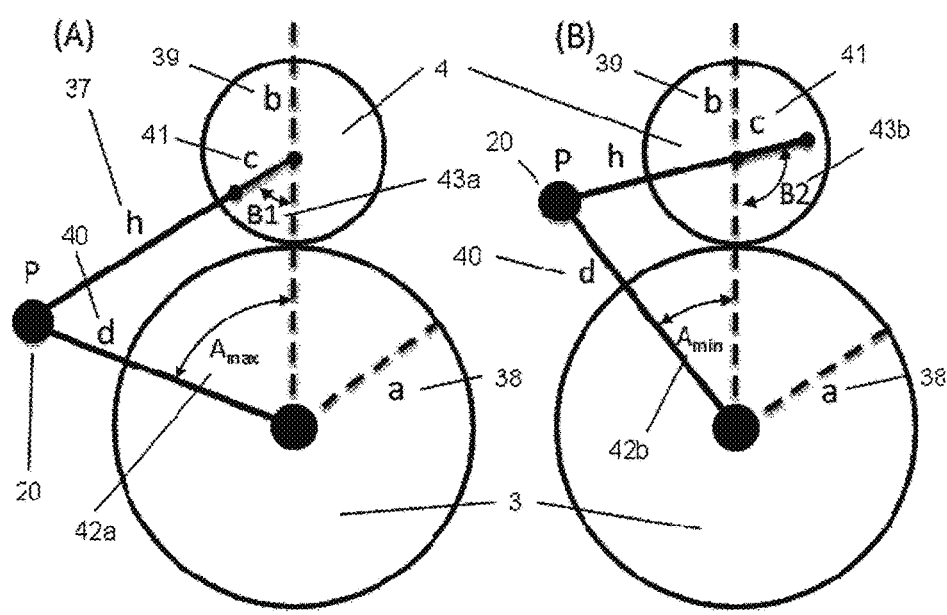
FIG. 19 is a schematic showing two extreme positions of the example push pin attached to the example piston disk showing an example of disk motion that is not symmetric about Top Dead Center.

FIG. 19 illustrates the desirability of constraining the possible locations of the push pin 20 mounted on the oscillating piston disk 5 and the length of the push arm 7. In FIG. 19, the radius of the main gear 3 is variable a (38), the radius of the secondary gear 4 is variable b (39). The location of the disk mounted push pin 20 is shown as position P. The length of the push rod 7 is the variable h (37), the distance of push pin 20 from the centerline of the main gear 3 is the variable d (40). The crank off-set distance on the crank shaft is the variable c (41). As the secondary gear 4 of the crank shaft rotates through the angle B1 (43a) to B2 (43b), the piston disk oscillates back and forth with the position of the push pin 20 going from angle $A_{max}$ (42a) to angle $A_{min}$ (42b), the two extremes of the oscillation. Note that the angle B (43) between the two extreme positions is not different by 180 degrees. This means that the piston disk shown moves to the right faster than it moves to the left. The other piston disk which is mounted to the opposing axis of the crank shaft does the same thing but displaced in time by one half of the revolution of the crank shaft. Therefore, the pistons mounted on each of the disks arrive at the positions of Top Dead Center (TDC) and Bottom Dead Center (BDC) at different times. This asymmetry in the motion is not desirable since it limits the compression ratio and hence the power capability.

Figure 20:
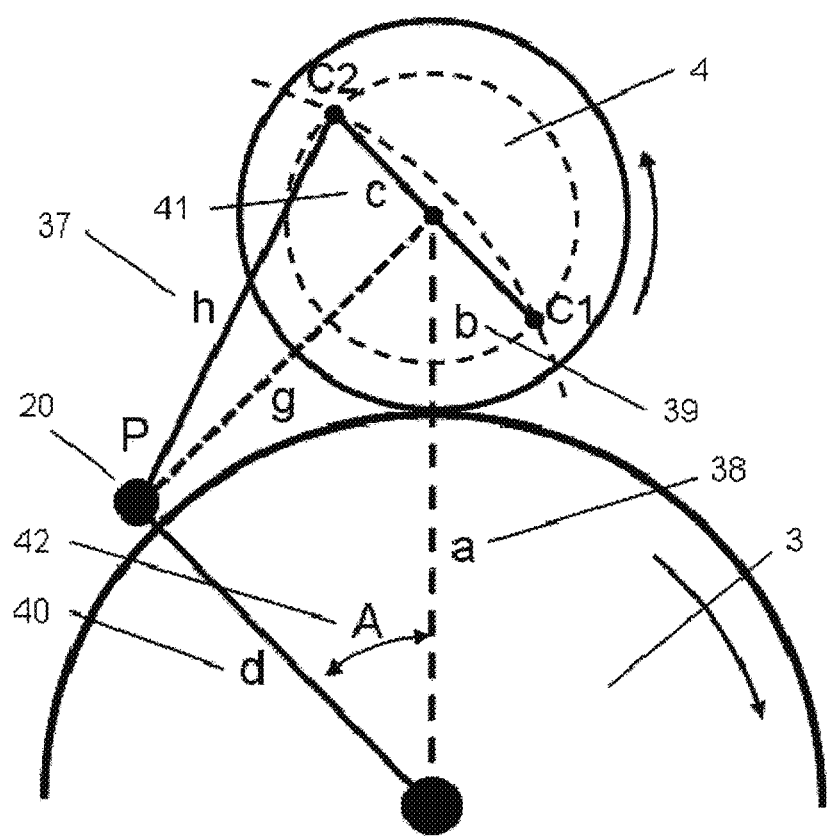
FIG. 20 is a schematic for showing example dimensions of the push rod and push pin location such that the disk motion is symmetric about Top Dead Center.

This situation is resolved as shown in FIG. 20. In this figure, the points labeled C1 and C2 are separated by exactly one-half revolution of the crank shaft. In order for the motion of the pistons to be symmetrical about Top Dead Center, the average angle between the line from the push pin 20 to the centerline d (40) and the line of the push rod h (37) should be 90 degrees. When the push rod h (37) is at either position C1 or C2, the angle A (42) is the same, and the pistons are in the identical position moving either left or right. The push rod h (37) moving from point C1 to point C2 takes the same amount of time as moving from point C2 to point C1. Hence, the motion of the pistons is centered in time about this position. Moving in either direction, the two piston disks arrive at TDC at the same time and the motion is symmetrical about TDC. The values that result in this balance are specific to the design of this invention, and are given by the equations:

$$d=g=(a+b)/\sqrt{2} \qquad \text{Eq. (1):}$$

$$h=(d^2+c^2)^{1/2} \qquad \text{Eq. (2):}$$

The value of the variable c (41) sets the compression ratio of the engine. Once c is chosen along with the gear sizes a and b, then the values of d and h should have the specific values determined by the above equations.

Figure 21:
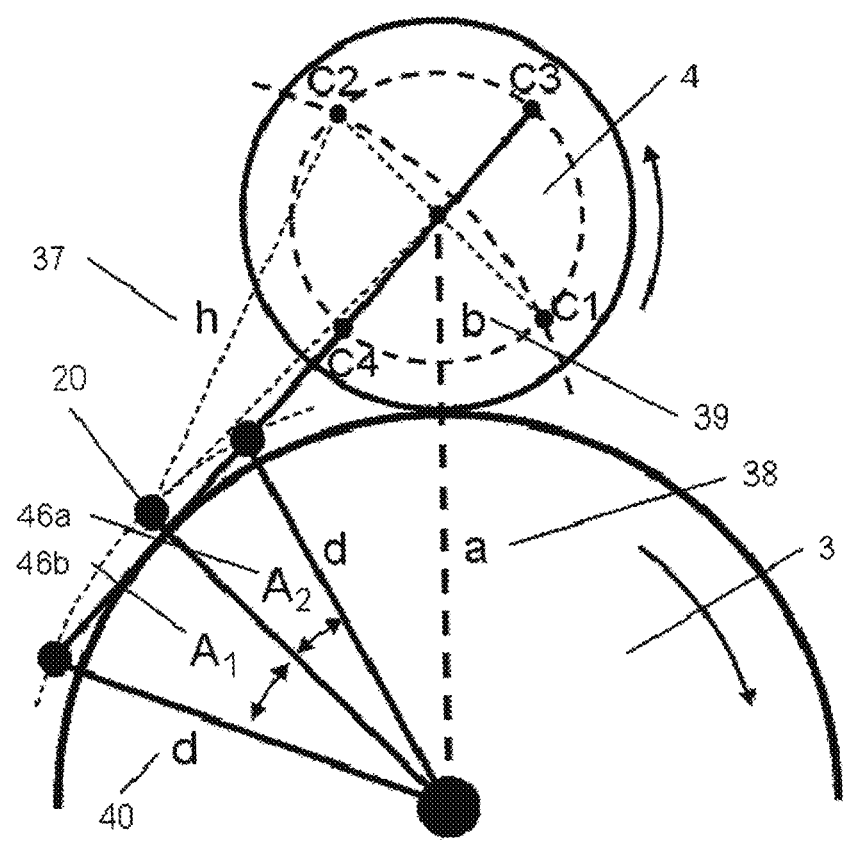
FIG. 21 is a schematic showing that motion of the example piston disk in the two directions occur at different speeds resulting in a "fast" chamber and a "slow" chamber.

Even though the motion is symmetrical about Top Dead Center, it is not identical for the even and odd numbered chambers. This is shown in FIG. 21. From the midpoint location in time, the piston moves farther in one direction than it does in the other. This is true for all rotating crank shaft configurations, and even happens in the traditional automobile engine. The motion is each direction for this disclosed engine leads to a compression in either the even numbered chambers or the odd numbered chambers. Therefore, the engine has one set of chambers where the piston moves "fast" and an alternating set of chambers where the piston moves "slow". As the crank shaft 4 rotates through half a rotation from position C1 to C3 to C2, the push pin location on the piston disk 20 moves through angle $A_2$ (46a). This angle is smaller than angle $A_1$ (46b), which is the angle the piston disk 20 moves for the other half of the crank shaft rotation from C2 to C4 to C1. The impact this has on the design of the engine is to cause the timing of the valves or the positions of the ports to be different in the even and odd sets of chambers.

Figure 22:
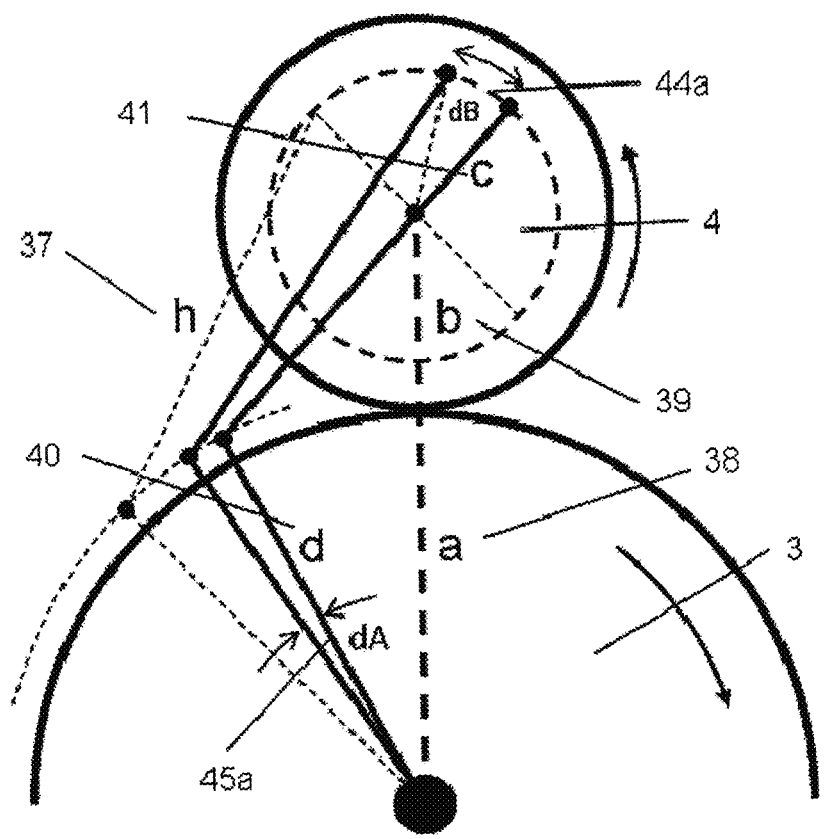
FIG. 22 shows a relation between the rotation angle of the example crank shaft away from Bottom Dead Center and the angular motion of the example piston disk.
Figure 23:
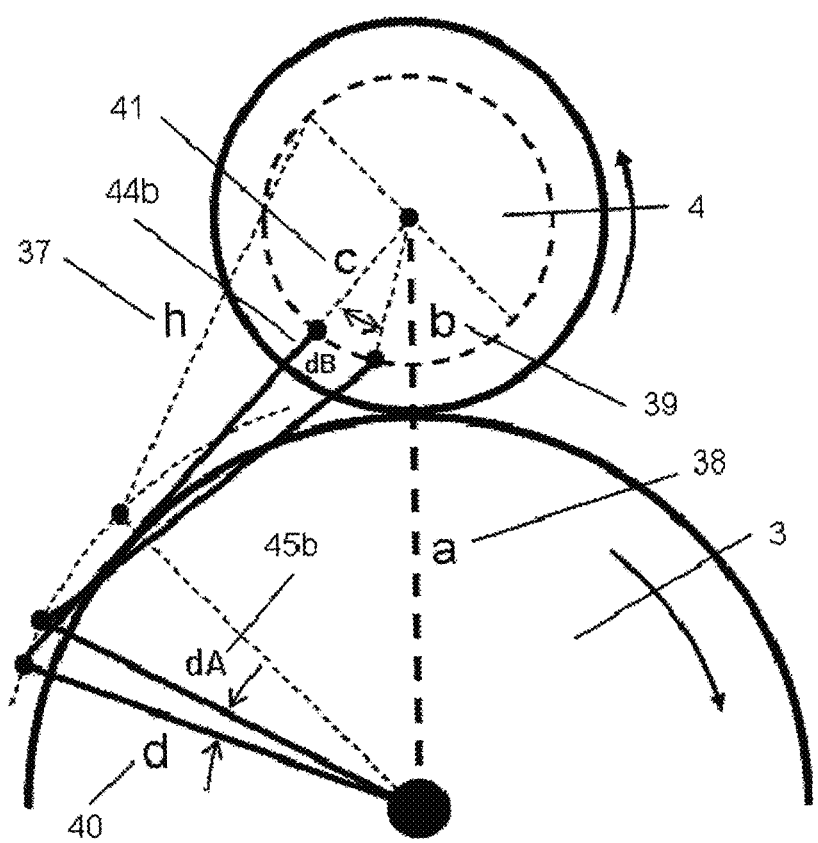
FIG. 23 shows the relation between the rotation angle of the example crank shaft away from Top Dead Center and the angular motion of the example piston disk which is one half cycle later than FIG. 19.

The method for finding the location of the ports for the two-cycle embodiment and the method for timing the valves in the expander embodiment is shown in FIG. 22 and FIG. 23. In FIG. 22, the crank shaft is shown rotated through angle dB (44a) relative to the position at Bottom Dead Center causing the piston disk to move through angle dA (45a). In FIG. 23, the crank shaft is shown rotated through the same angle dB (44b) but relative to the position at Top Dead Center which causes the piston disk to move through a different angle dA (45b). Whereas the size of the angle dB in the two figures is the same indicating the same amount of elapsed time from the extreme positions, the sizes of the angle dA is not the same.

In the two cycle example of this embodiment, the size of the intake and exhaust ports within each chamber is determined by the amount of time within a single stroke that the ports are to be exposed. Since the angle dA is not the same in the even and odd chambers for the same amount of elapsed time, then the port edges where the piston closes the ports are located at a different angles relative to the positions at Bottom Dead Center.

Similarly, in the expander embodiment of this invention, the timing of the closing of the intake valve sets the expansion ratio for the high pressure gas. Since there is a fast and slow chamber, the timing is slightly different for the even and odd chambers. The method for calculating these differences for the two types of chambers is provided below.

Figure 24:
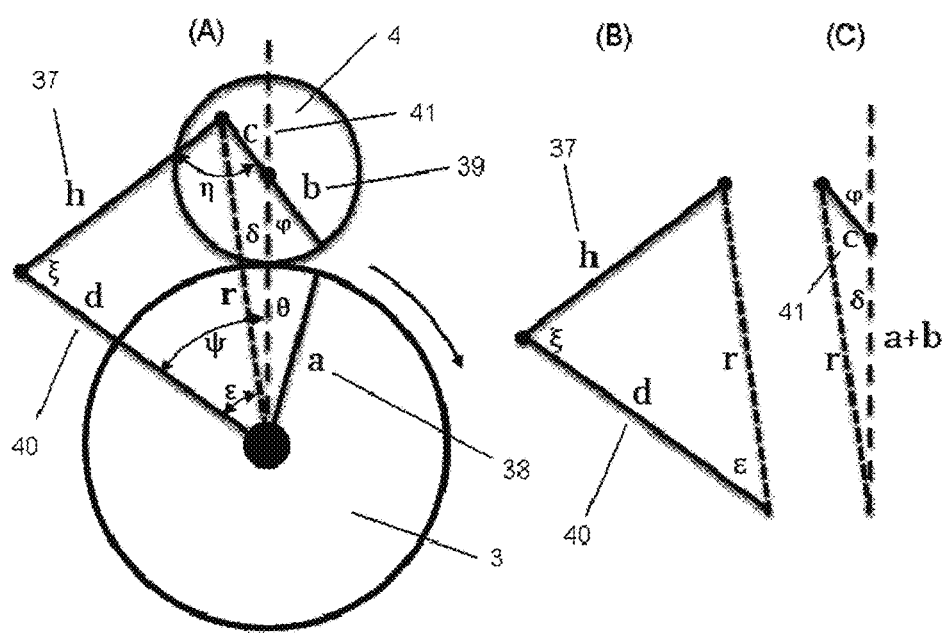
FIG. 24 shows the angles used in the calculation of example engine performance.

FIG. 24 shows the angles used to calculate the performance of the engine in this invention. In the figure, a (38) is the radius of the main gear, b (39) is the radius of the secondary gear, c (41) is the cam off-set distance, d (40) is the distance of the push pin from the center line, h (37) is the length of the push arm that connects the oscillating disk with the off-set axis on the crank shaft. The main gear rotates clockwise through angle θ, the secondary gear rotates counter-clockwise through angle φ, the angle ψ gives the relative motion of the pistons on the disk. The angles ξ and η are needed in calculating the torque produced by the engine. The angles δ and ϵ and the distance r are intermediate values needed in finding the other parameters.

FIGS. 24 (B) and (C) show the two triangles in the diagram that are used to find all the angles.

Equation (3) follows from the equivalence of the arc lengths on rolling gears.

$$aθ=bφ \qquad \text{Eq. (3):}$$

Equations (4), (6), and (7) follow from the law of cosines for the triangles shown in FIG. 24(B) and FIG. 24(C). Equation (5) follows from the law of sines for these triangles.

$$r^2=(a+b)^2+c^2-2(a+b)c^*\cos(180-φ) \qquad \text{Eq. (4):}$$

$$\sin(δ)=c^*\sin(180-φ)/r \qquad \text{Eq. (5):}$$

$$\cos ϵ=(r^2+d^2-h^2)/(2rd) \qquad \text{Eq. (6):}$$

$$\cos ξ=(h^2+d^2-r^2)/(2hd) \qquad \text{Eq. (7):}$$

Equations (8) and (9) follow from inspection of FIG. 24(A).

$$ψ=ϵ+δ \qquad \text{Eq. (8):}$$

$$η=180-ψ-ξ+φ \qquad \text{Eq. (9):}$$

Equations (10) and (11) give the extreme values of ψ (labeled as angle A (42) in FIG. 19). These angles are used to determine the compression ratio since they show the limits of the motion of the pistons. The equations follow from the law of cosines for the relevant triangles.

$$\cos \psi_{min} = \cos A_{min} = ((a+b)^2 + d^2 - (h-c)^2)/(2d(a+b)) \quad \text{Eq. (10):}$$

$$\cos \psi_{max} = \cos A_{max} = ((a+b)^2 + d^2 - (h+c)^2)/(2d(a+b)) \quad \text{Eq. (11):}$$

Figure 25:
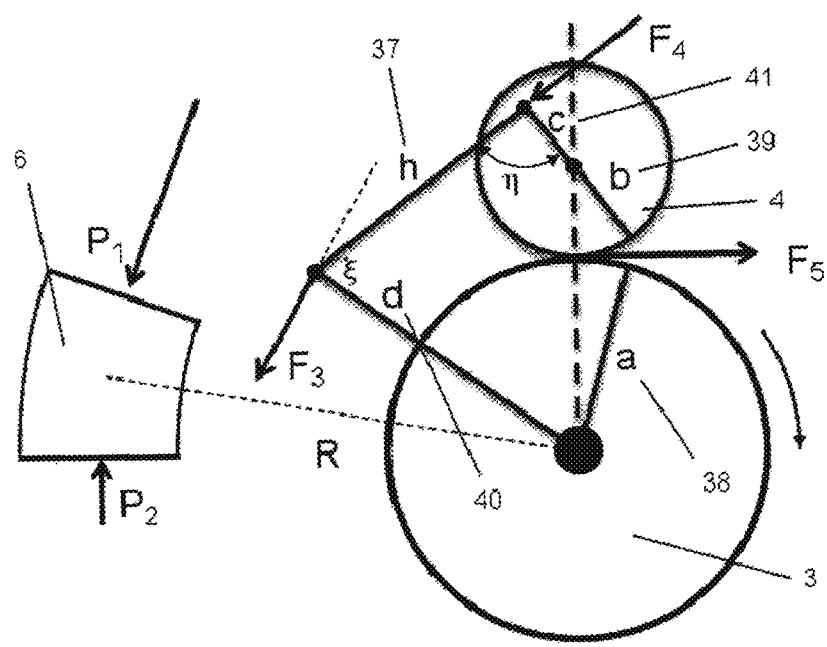
FIG. 25 shows the angles and forces used to calculate the torque produced by the engine along with the rate of rotation in revolutions per minute to obtain the power.

The torque and power generated by the engine are calculated using the angles and forces shown in FIG. 25. For a single piston on one of the disks, the pressure on one side is represented by $P_1$ and the pressure on the other side by $P_2$. These pressures change with time during the combustion process or during the expansion process as the engine rotates. If the area of the piston face is given by $A_P$, then the force on the piston $F_1$ at any instant in time is given by equation (12).

$$F_1 = (P_1 - P_2) A_P \quad \text{Eq. (12):}$$

If the distance from the center of the piston face to the centerline of the engine is given by R, then the torque $T_1$ produced on the disk is given by equation (13) where N is the number of pistons on the disk.

$$T_1 = N F_1 R \quad \text{Eq. (13):}$$

Since the piston disk is rigid, the torque at the push pin is the same as equation (13), and since the moment arm relative to the engine centerline is the variable d (40), the force on the pin $F_3$ is given by equation (14).

$$F_3 = T_1/d = N F_1 R/d \quad \text{Eq. (14):}$$

The push rod is at an angle ξ (close to 90 degrees) relative to the push pin moment arm, and the force in the direction of the rod $F_4$ is increased by the inverse of the cosine of the angle (this is due to an increase in the leverage about the center point). This is shown in equation (15).

$$F_4 = F_3/\cos(90-\xi) \quad \text{Eq. (15):}$$

The torque about the crank shaft center line is the force $F_4$ times the moment arm perpendicular to that force. This moment arm changes constantly as the crank shaft rotates. At any instant in time, the torque is given by equation (16).

$$T_4 = F_4 c \sin(\eta) \quad \text{Eq. (16):}$$

Now, since the secondary gear is rigid, the torque at the edge of the gear is the same as equation (16), so the force at the edge of the gear $F_5$ can be written as in equation (17).

$$F_5 = T_4/b \quad \text{Eq. (17):}$$

Finally, the torque on the main gear $T_5$ is related to the force as in equation (18).

$$T_5 = F_5 a \quad \text{Eq. (18):}$$

When equations (12) through (18) are combined, the torque related to the pressure in the piston chamber becomes equation (19).

$$T_5 = N(P_1-P_2) A_P R a c \cos(90-\xi)\sin(\eta)/(bd) \quad \text{Eq. (19):}$$

The angles ξ and η are related to the rotation angle of the crank shaft by equations (4) through (9). All that remains is to relate the pressures in the chambers to the rotation angle, and the full performance of the engine can be calculated.

Figure 26:
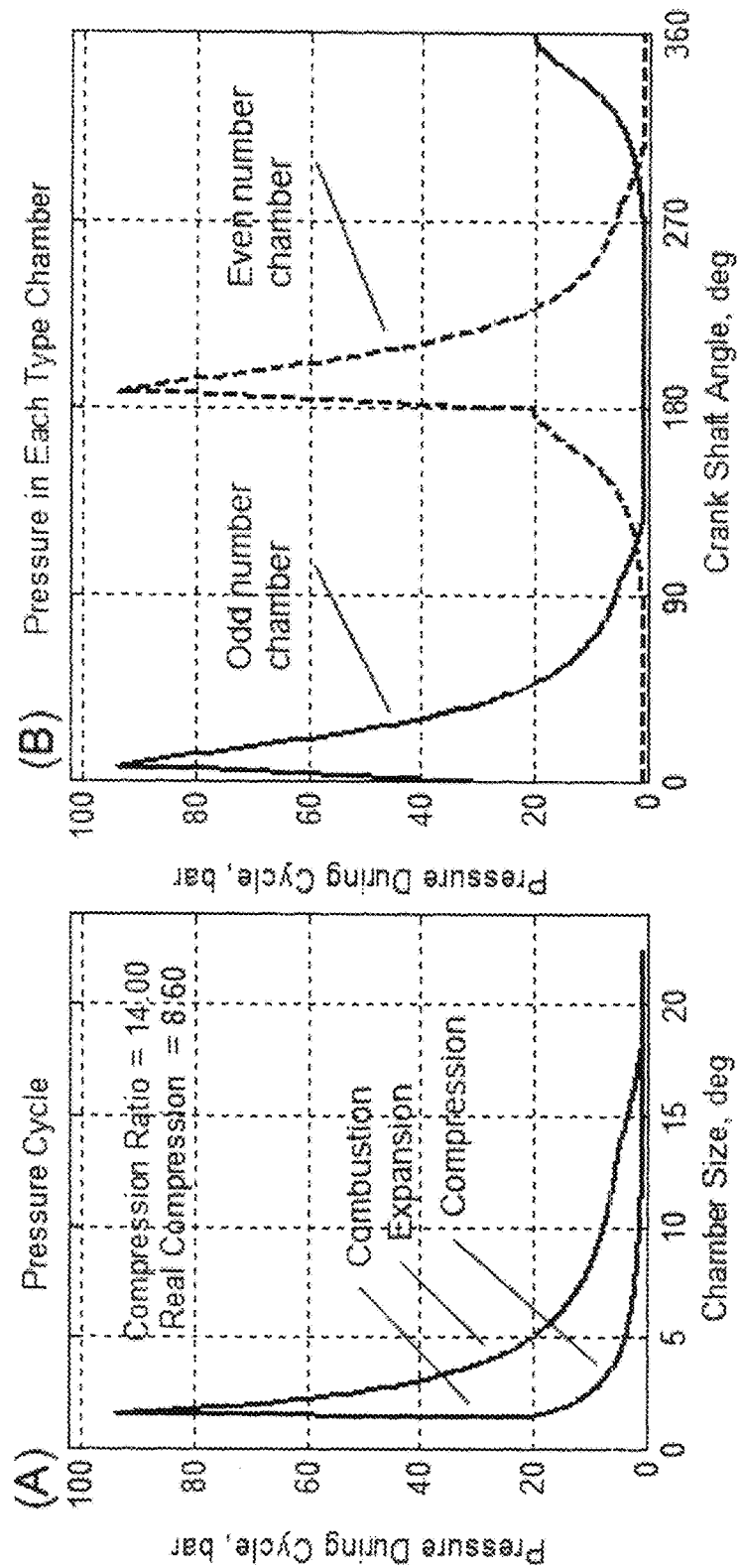
FIG. 26 shows the pressure used in the torque calculation for the example two cycle embodiment of this invention.

For the two cycle embodiment used as the example in the figures, the pressure in the combustion chamber can be modeled as shown in FIG. 26. The portion of the figure on the left shows the familiar pressure curve for a two cycle engine as a function of the size of the combustion chamber. During the compression phase, the size of the chamber decreases and the pressure of the gas inside rises. When the piston reaches Top Dead Center, the gases burn and the pressure rises rapidly. Then as the piston moves away from Top Dead Center, the pressure drops in the expansion phase. At the end, when the piston nears Bottom Dead Center, the exhaust port opens and the pressure drops to near ambient. The portion of the figure on the right in FIG. 26 shows the same pressure curve except plotted against the crank shaft angle. The pressure in the odd numbered chambers have the same shape as the pressure in the even numbered chambers except displaced by one half of the rotation of the crank shaft.

Figure 27:
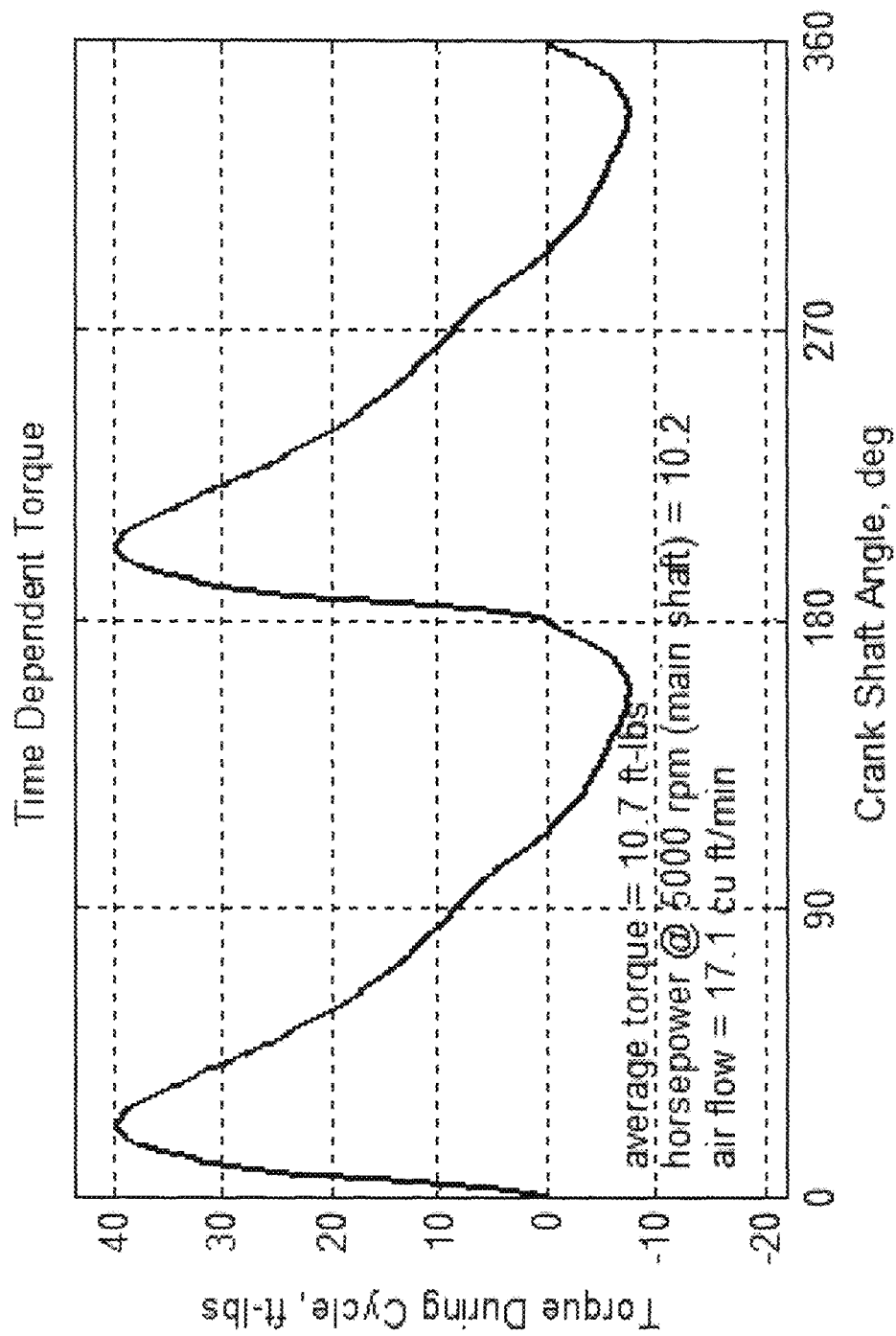
FIG. 27 shows the torque generated at the main shaft as a function of the crank shaft rotation angle for the example two cycle embodiment of this invention.

FIG. 27 shows the torque on the main shaft as a function of the angle of the crank shaft. The torque peaks at about 40 ft.-lbs., goes negative for a short time during the maximum compression of the gas, and averages about 10 ft.-lbs. At a main shaft speed of 5,000 rpm, which is a relatively slow speed for an engine of this small size, the two cycle engine produces a little over 10 horsepower. The top engine speed is limited by the average piston speed. For common gasoline engines, the operating average piston speed is about 2500 ft/min. For the example engine in this embodiment, this gives an operating engine speed of >35,000 rpm. Hence, the example engine the size of a 2 pound coffee can generate about 70 horsepower.

Figure 28:
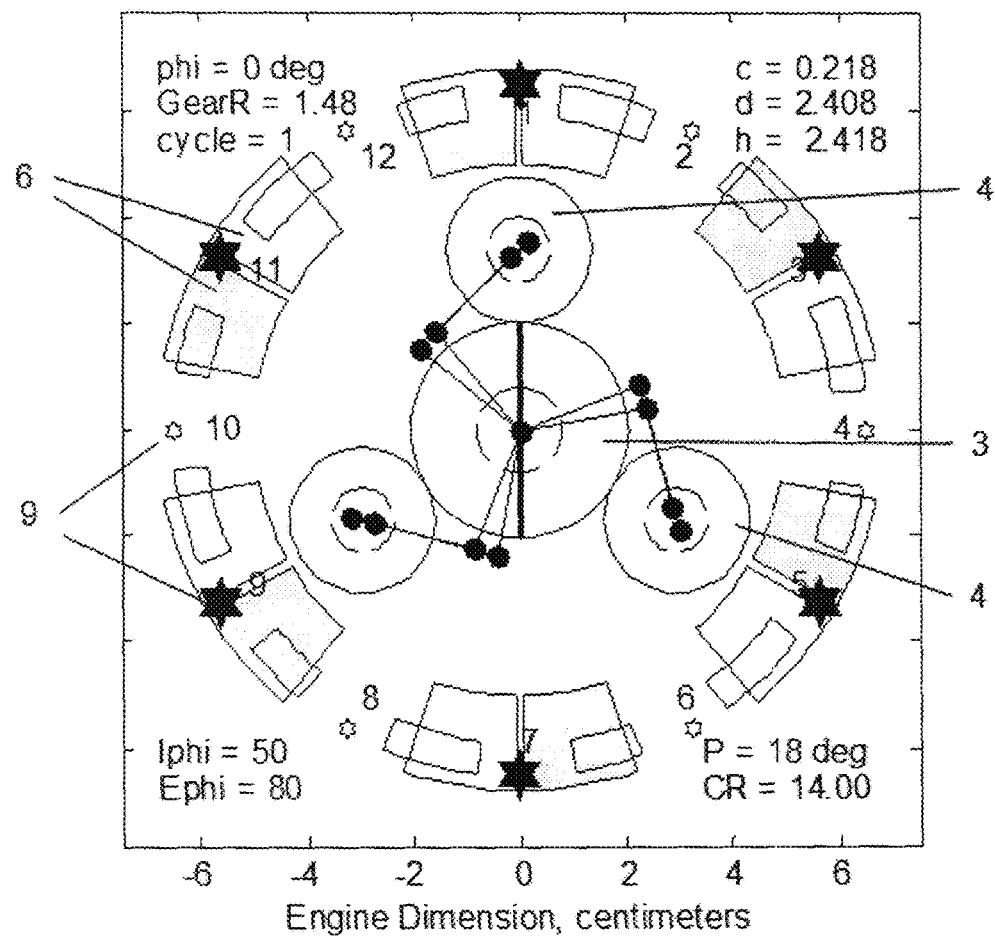
FIG. 28 shows the embodiment of the example two cycle engine with twelve cylinders and three crank shafts.

FIG. 28 illustrates the example two cycle engine at the point where the pistons 6 in the odd chambers are at Top Dead Center. The figure shows the location of twelve glow plugs 9 and the size of the main gear 3 and the secondary gears 4. This embodiment is the twelve cylinder two cycle engine discussed in the body of this patent with intake and exhaust ports. Each piston is 18 degrees wide, has a face diameter of 1.8 cm., and is mounted on a disk of radius 5.0 cm. The compression ratio is 14:1 and the gear ratio between the main gear and the secondary gear is 1.485. This set of choices result in a crank shaft off-set distance which is 2.18 mm, the distance from the centerline to the push pin is 24.1 mm, and the length of the push rod is 24.2 mm. The intake port is sized and positioned for the case that the crank shaft rotates 50 degrees past Bottom Dead Center, and the exhaust port is sized and positioned for the case that the crank shaft rotates 80 degrees past Bottom Dead Center.

Figure 29:
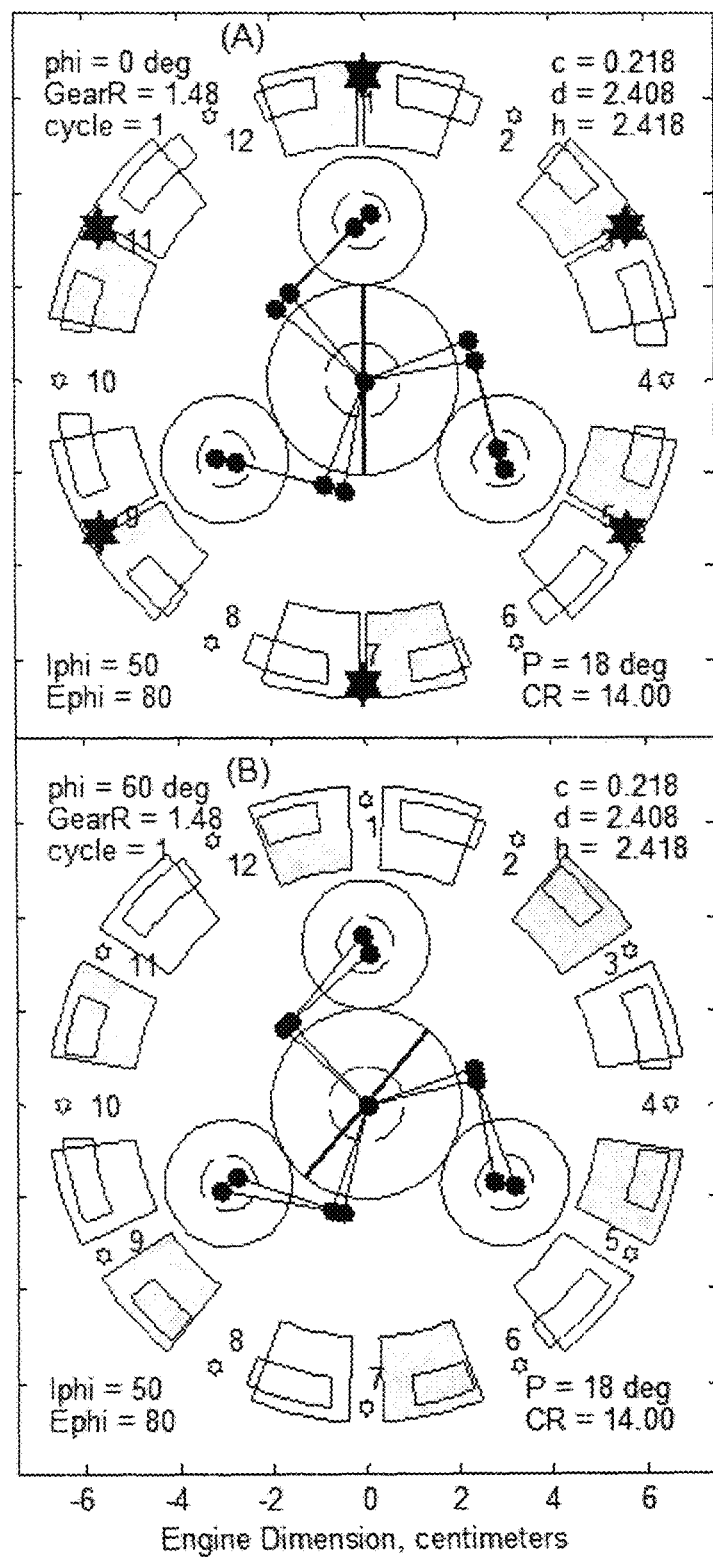
FIGS. 29, 30, and 31 show the sequence of motion of the piston disks and crank shafts as the example two cycle engine goes through a complete revolution of the crank shaft.
Figure 30:
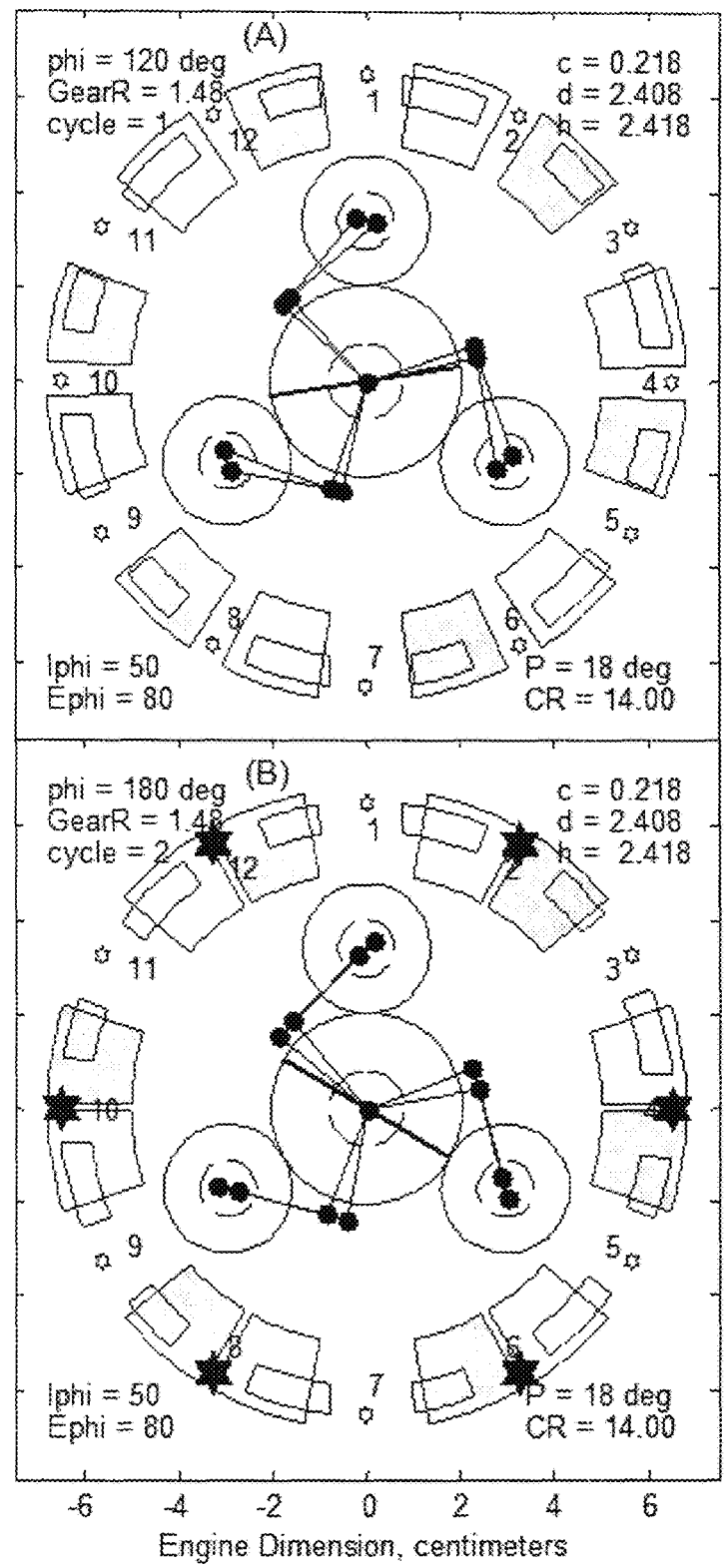
Figure 31:
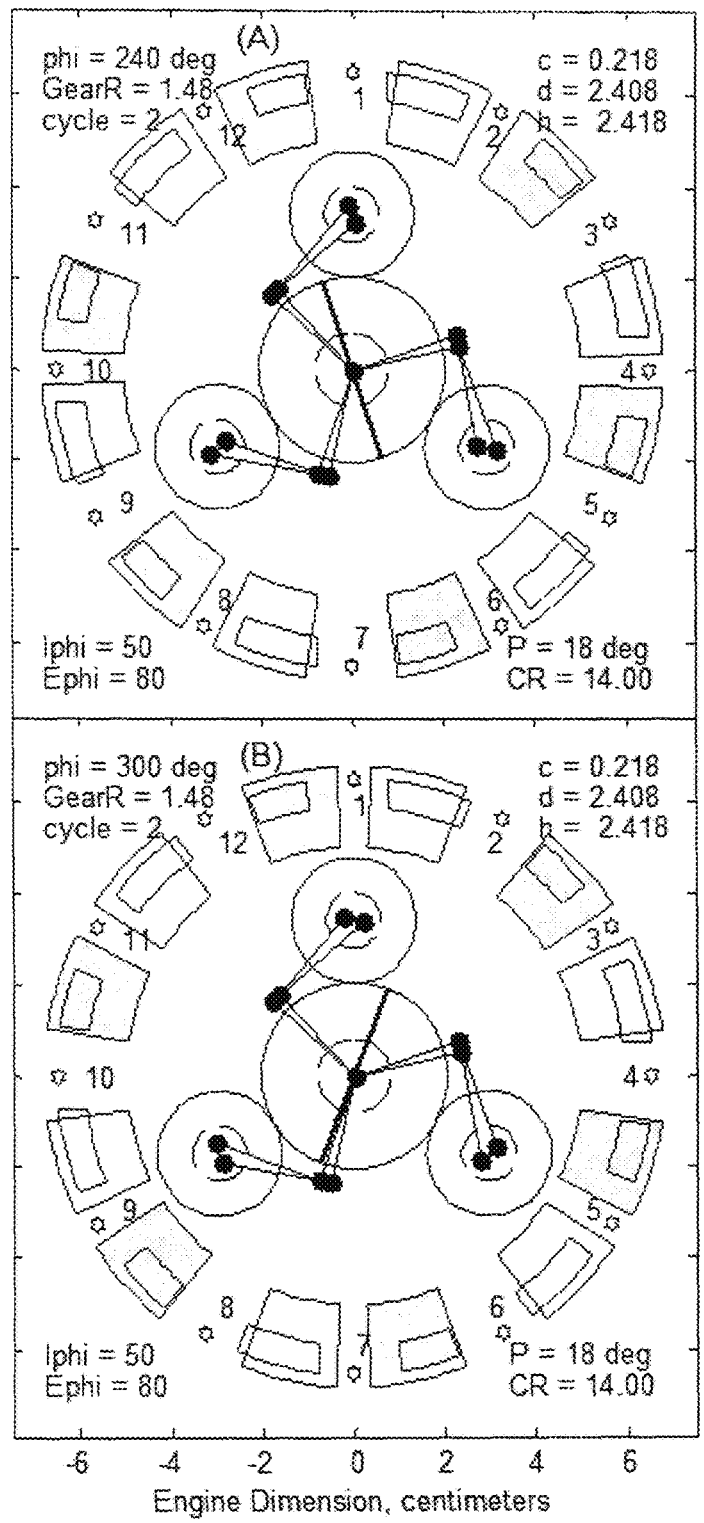

FIGS. 29, 30, and 31 illustrate the sequence of motion as the crank shaft rotates through 360 degrees in 60 degree steps. The sequence starts in FIG. 29 (A) with the odd pistons at Top Dead Center and the even pistons at Bottom Dead Center. Combustion has just started in the odd chambers while the intake and exhaust ports are fully exposed in the even chambers. As the crank shafts rotate, the ports are covered in the even chambers under compression and opened in the odd chambers under expansion. Half way through the rotation in FIG. 30 (B), the even chambers reach Top Dead Center where combustion occurs and the odd chambers are at Bottom Dead Center. Then in FIG. 31, the odd chambers are in compression and the even chambers are in expansion. In this scale of diagram, the ports appear to be symmetrically placed in the two types of chambers, but, in fact, they are not symmetrically placed since there is a fast side and a slow side to the motion of the pistons. The equations (3) through (8) (described above) allow the calculation of the piston face position relative to the crank shaft angle, and this detailed calculation gives the exact location of the edge of the ports.

Figure 32:
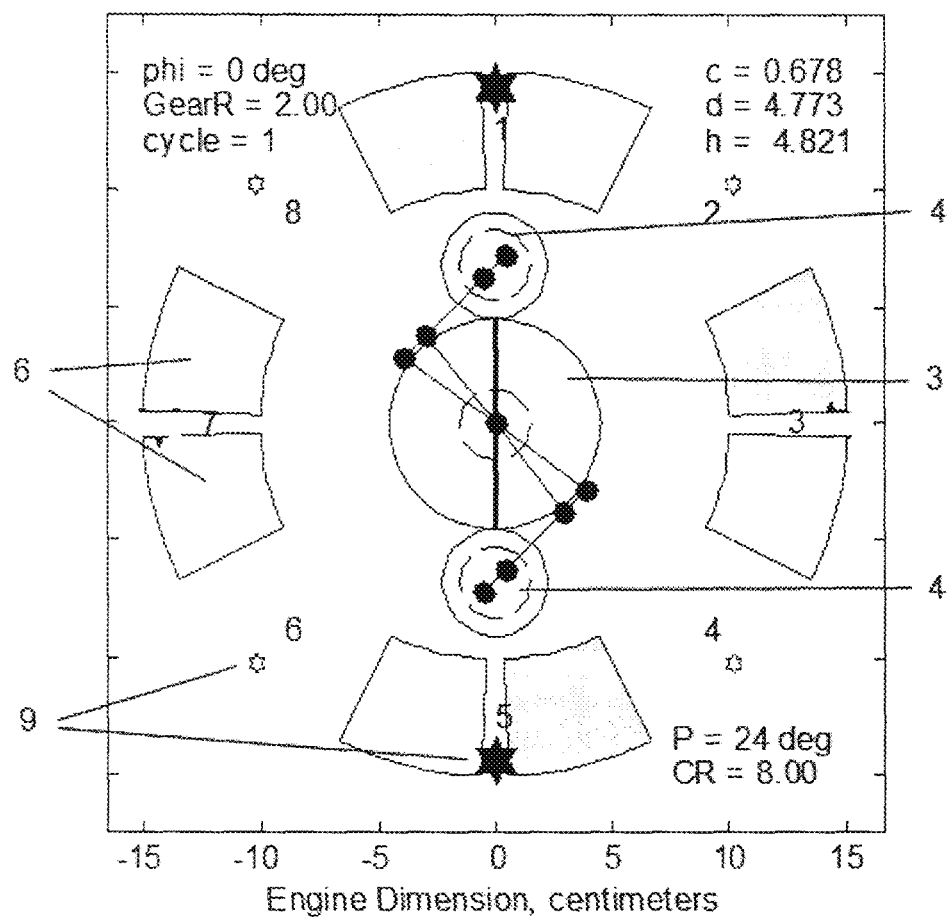
FIG. 32 shows a four-cycle example embodiment of the engine with eight cylinders and two crank shafts.

FIG. 32 illustrates a different embodiment of the invention with a different set of the nine options. In this embodiment, the engine is a four cycle engine with a compression ratio of 8:1 with eight cylinders (four pistons on each disk) and two crank shafts. The gear ratio between the main gear and the secondary gear is 2:1, the piston face diameter is 5.0 cm., the piston thickness is 24 degrees, and the piston disk radius is 10 cm. For this set of choices, the crank shaft axis off-set distance is 6.78 mm, the distance from the centerline to the push pin is 47.7 mm, and the length of the push rod is 48.2 mm. This embodiment uses valves instead of ports for the intake and exhaust function. Unlike the ports in the two-cycle example, the valves in the four-cycle embodiment are located at the same angular position on the toroid as the spark plugs.

Figure 33:
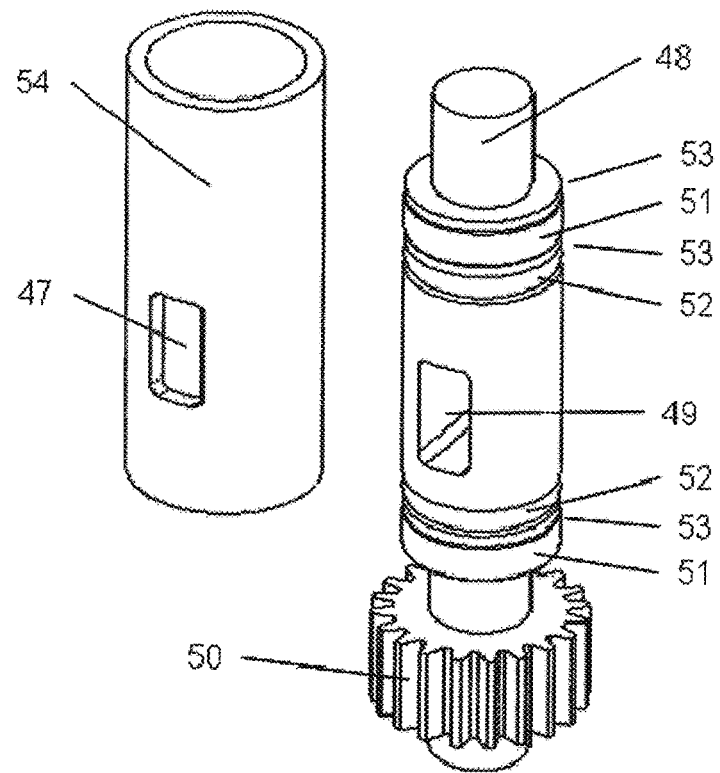
FIG. 33 shows an example embodiment of a rotational valve which can be used with the four cycle engine or with the expander.

FIG. 33 shows one of the possible embodiments of the valves. The rotating valve assembly 48 fits snuggly inside the fixed valve casing 54. As the valve rotates, the rotating slot 49 aligns with the fixed slot 47 to open the valve to the combustion or expansion chamber. The valve assembly has bearings 51, O-rings 52, and washers 53 to facilitate rotation and provide a seal. The valve has a gear 50 that is driven by an annular ring gear that turns the valve at exactly one-fourth the rate of the crank shaft. The phasing of the opening of the intake valves is such that the slots in the valve 49 and valve casing 47 are aligned during the intake stroke of the pistons. The phasing for the exhaust valves is 45 degrees shifted from the phasing of the intake valves such that the slots are aligned during the exhaust stroke of the piston. Valves such as this embodiment would also be used with the expander embodiment of this invention. For the expander, the ring gear would turn the valves at one-half the rate of the crank shaft. The exhaust valve would be open for the full exhaust stroke, but the intake valve would only be open for a fraction of the intake stroke. This different timing is created by controlling the sizes of the slots in the valve and the valve casing. The timing on the intake valve is determined by the chosen expansion ratio for the expander. If the expansion ratio is 2:1, for example, then the intake valve is open for only half of the intake stroke.

Figure 34:
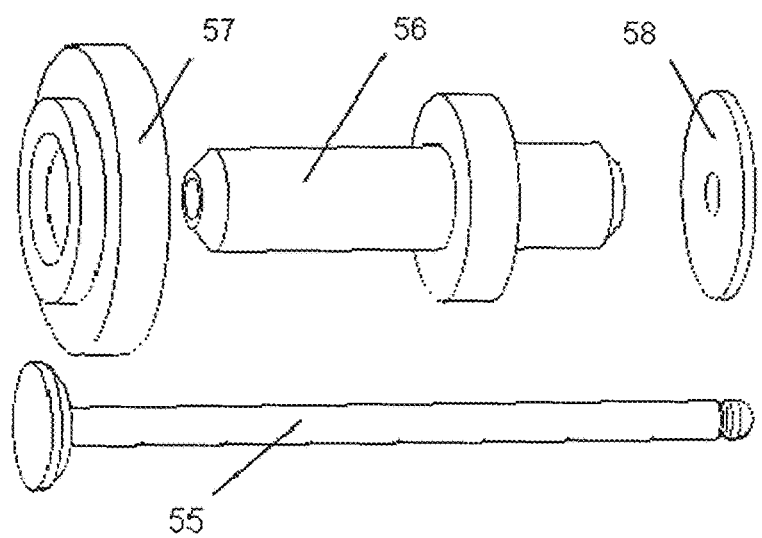
FIG. 34 shows a second example embodiment of a valve which can be used with the four cycle engine.

FIG. 34 shows another type of the valve that could be used with the four stroke embodiment of the engine. This valve is common in motorcycle engines and can also be used where the activation element is a rotating cam. The body of the valve (55) fits inside a valve guide (56). When closed, the beveled end of the valve sits tight against the valve seat (57). The valve is held closed by a spring that fits between the spring retaining washer (58) and the flange on the valve guide (56). The valve is activated by a cam that pushes on the end of the valve near the spring retaining washer and that is geared to one of the crank shafts. Any number of different embodiments of valve designs can be used.

Figure 35:
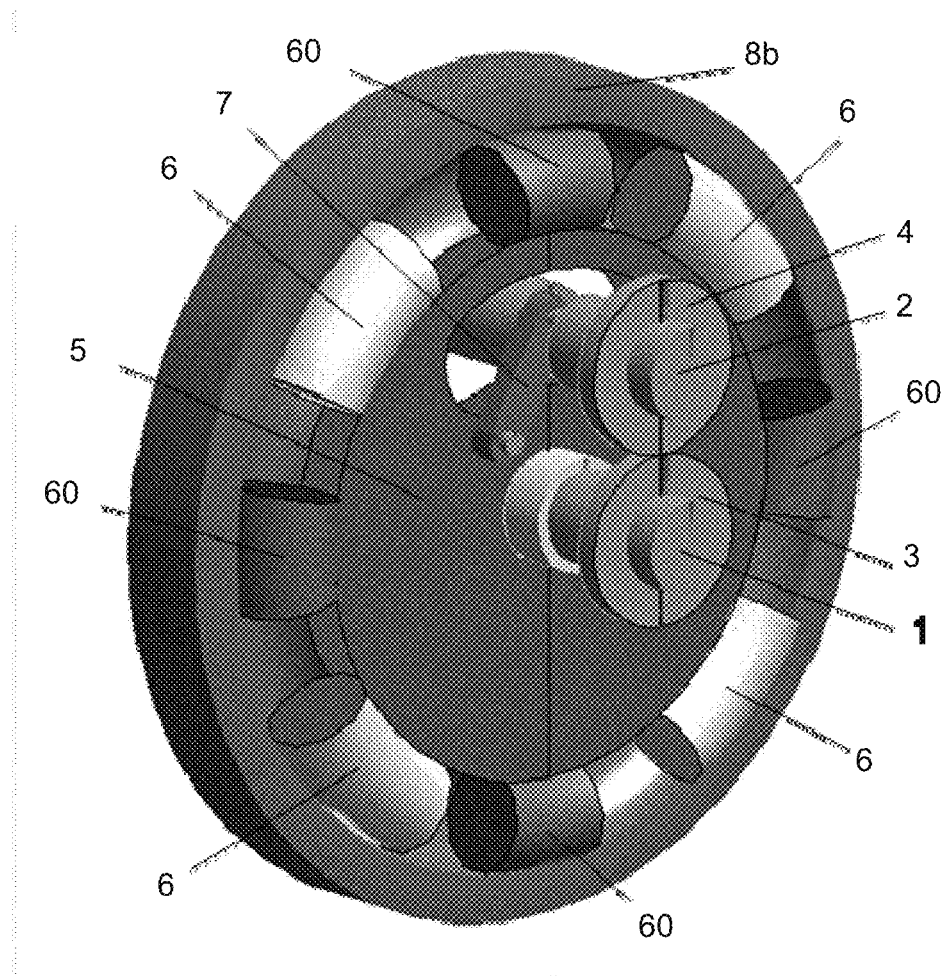
FIG. 35 shows the embodiment of the invention using option 9 as a choice where one of the sets of pistons is fixed rigidly to half of the toroid.

FIG. 35 shows an example of the embodiment of option 9, where one set of pistons is fixed rigidly to the toroidal chamber, and the movable set of pistons moves twice as far within the toroid. In this example, the main gear 3 on the main shaft 1 is the same size as the crank shaft gear 4 on the crank shaft 2. There are four pistons 6 on the movable disk 5 and for this example there is only one crank shaft. There are also four pistons 60 that are fixed rigidly to the half toroid 8*b*. The rigidly fixed pistons 60 are 20 degrees of arc in thickness, while the moving pistons 6 are 30 degrees of arc in thickness. Other values can be chosen for the piston sizes which result in a different cam offset distance for the push rod 7. Other designs using different numbers of pistons can also be utilized.

The engines disclosed herein can be used for many different purposes, and can be sized according to needs such as by sizing the components appropriately, or by adding a plurality of the toroid/piston/disk pair units onto a single main shaft to increase the power of the engine.

Many other example embodiments of the invention can be provided through various combinations of the above described features. Although the invention has been described hereinabove using specific examples and embodiments, it will be understood by those skilled in the art that various alternatives may be used and equivalents may be substituted for elements and/or steps described herein, without necessarily deviating from the intended scope of the invention. Modifications may be necessary to adapt the invention to a particular situation or to particular needs without departing from the intended scope of the invention. It is intended that the invention not be limited to the particular implementations and embodiments described herein, but that the claims be given their broadest reasonable interpretation to cover all novel and non-obvious embodiments, literal or equivalent, disclosed or not, covered thereby.

What is claimed is:

1. An engine comprising:
    a piston pair including a first piston having first and second combustion faces with said first combustion face arranged opposing a combustion face of a second piston;
    a housing for forming a chamber corresponding to the piston pair, such that the first piston and the second piston are arranged with said opposing combustion faces within the chamber for forming an expansion volume between said first piston and said second piston that is fixed about a combustion point, wherein
    said second combustion face of said first piston is provided in another chamber for forming another expansion volume:
    a main shaft;
    one or more crank shafts;
    a piston transmission mechanism comprising a push rod connected to a crank of one of said crank shafts for converting a motion of said first piston and said second piston away from each other, thereby expanding said expansion volume, into a rotation of at least one of said one or more crank shafts; and
    one or more rotation transmission mechanisms comprising a first gear connected to one of said crank shafts in connection with a second gear connected to said main shaft, each one of said transmission mechanism for connecting one of said one or more crank shafts to said main shaft for rotating said main shaft when said one or more crank shafts rotate.

2. The engine of claim 1, wherein there are a plurality of said crank shafts that are distributed around and offset from, but parallel to, said main shaft.

3. The engine of claim 1, wherein said pistons are mounted on one or more disks, and wherein said one or more crank shafts pass through a portion of said one or more discs not through a center axis of said disks.

4. The engine of claim 3, wherein a subset of said pistons are mounted on a first one of said disks, and another subset of said pistons are mounted on a second one of said disks, such that the motion of the pistons in said first subset and said second subset cause said disks to oscillate in opposition to each other.

5. The engine of claim 1, wherein said chamber has a radius of curvature, and wherein pistons are formed having a curvature that matches the curvature of said chamber.

6. The engine of claim 1, wherein said pistons have a circular cross section.

7. The engine of claim 1, wherein said chamber has a circular cross section.

8. The engine of claim 1, wherein each one of said one or more crank shafts is provided at a fixed location with respect to said main shaft.

9. The engine of claim 1, wherein said first piston is arranged with a third piston to form another expansion volume between said first piston and said third piston.

10. An engine comprising:
- a piston pair including a first piston arranged opposing a second piston both provided in a starting position;
- a housing for forming a chamber corresponding to the piston pair, such that the first piston and the second piston are arranged within the chamber for forming an expansion volume between said first piston and said second piston;
- a main shaft;
- one or more crank shafts;
- a piston transmission mechanism comprising a push rod connected to a crank of one of said crank shafts for converting a motion of one or both of said first piston and said second piston, during a power stroke expanding said expansion volume, into a rotation of at least one of said one or more crank shafts; and
- one or more rotation transmission mechanisms comprising a first gear connected to one of said crank shafts in connection with a second gear connected to said main shaft, each one of said rotation transmission mechanisms for connecting one of said one or more crank shafts to said main shaft for rotating said main shaft when said one or more crank shafts rotate, wherein
- subsequent to said power stroke, both of said first piston and said second piston are moved to return to said starting position to support another power stroke expanding another expansion volume.

11. The engine of claim 10, wherein said engine is configured such that another power stroke expanding another expansion volume returns said first piston and said second piston to said starting position.

12. The engine of claim 10, wherein said pistons are mounted on one or more disks, and wherein said one or more crank shafts pass through a portion of said one or more discs not through a center axis of said disks.

13. The engine of claim 12, wherein a subset of said pistons are mounted on a first one of said disks, and another subset of said pistons are mounted on a second one of said disks, such that the motion of the pistons in said first subset and said second subset cause said disks to oscillate in opposition to each other.

14. The engine of claim 10, wherein said chamber has a radius of curvature, and wherein pistons are formed having a curvature that matches the curvature of said chamber.

15. The engine of claim 10, wherein at least one of said crank shafts is offset from an axis of the main shaft.

16. The engine of claim 10, wherein each one of said one or more crank shafts is provided at a fixed location with respect to said main shaft.

17. The engine of claim 10, wherein said first piston is arranged with a third piston to form another expansion volume between said first piston and said third piston.

* * * * *